United States Patent
Vincent et al.

(10) Patent No.: US 6,482,081 B2
(45) Date of Patent: Nov. 19, 2002

(54) VEHICLE AIR-CONDITIONING INSTALLATION WITH TWO MIXING REGIONS

(75) Inventors: Philippe Vincent, Epernon (FR); Nicolas Abouchaar, Bad Rodach (DE)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/972,188

(22) Filed: Oct. 9, 2001

(65) Prior Publication Data

US 2002/0042248 A1 Apr. 11, 2002

(30) Foreign Application Priority Data

Oct. 11, 2000 (FR) .............................................. 00 13013

(51) Int. Cl.⁷ ................................................. B60H 1/32
(52) U.S. Cl. ........................... 454/121; 165/42; 165/43; 454/156
(58) Field of Search ................................. 454/121, 126, 454/156, 159, 160, 161; 165/42, 43

(56) References Cited

U.S. PATENT DOCUMENTS

| 3,656,541 | A | * | 4/1972 | Coyle et al. ................. 165/203 |
| 4,453,591 | A | | 6/1984 | Fehr |
| 4,537,245 | A | * | 8/1985 | Nishimura et al. ......... 165/203 |
| 4,593,852 | A | * | 6/1986 | Tajima et al. ........... 237/12.3 A |
| 5,267,896 | A | * | 12/1993 | Petters et al. .................. 165/42 |
| 5,738,579 | A | | 4/1998 | Pommier et al. |
| 6,311,763 | B1 | * | 11/2001 | Uemura et al. ................ 165/43 |
| 2002/0017383 | A | * | 1/1999 | Vincent ....................... 165/204 |
| 2001/0004015 | A | * | 12/2000 | Bendell et al. ............. 165/203 |
| 2001/0035019 | A1 | * | 3/2001 | Arold ........................... 62/244 |

FOREIGN PATENT DOCUMENTS

| DE | 36 19 935 A | 12/1987 |
| EP | 0 212 306 A | 3/1987 |
| FR | 2 621 868 A | 4/1989 |

* cited by examiner

*Primary Examiner*—Harold Joyce
(74) *Attorney, Agent, or Firm*—Liniak, Berenato, Longacre & White

(57) ABSTRACT

An upper mixing region (210) and a lower mixing region (214) are fed with hot air via a radiator (203) and with cold air by way of respective bypass ducts (205, 208). Respective mixing flaps (212, 219) make it possible to adjust the temperature separately in the two mixing regions, from where the treated air is sent into different parts of the passenger compartment of the vehicle.

According to the invention, the two bypass ducts (205, 208) pass below the radiator (203) which makes it possible to minimise the length of the path for the hot air between the radiator and the de-icing outlet duct (221) situated at the upper part of the casing (200) of the installation, and consequently to accelerate a de-icing or demisting of the windscreen required urgently for reasons of safety.

24 Claims, 18 Drawing Sheets

VEHICLE AIR-CONDITIONING INSTALLATION WITH TWO MIXING REGIONS

FIELD OF THE INVENTION

The invention relates to an installation for heating/ventilating or for air-conditioning of the passenger compartment of a vehicle, comprising a casing containing means for treating an airflow to be sent into the passenger compartment, the said means including at least one first source of heat or of cold and changeover-switching elements controlled in such a way as to define variable paths for the said airflow between at least one inlet and various outlets associated with respective regions of the passenger compartment, the casing defining a first mixing region linked to at least one of the said outlets and a second mixing region linked to at least one other of the said outlets, each of the said mixing regions being capable of receiving, in adjustable proportions, a first airflow having passed through the said first source and a second airflow having bypassed it.

BACKGROUND OF THE INVENTION

It is sometimes desired, for optimal and personalised comfort of the occupants of the vehicle, to send air into various regions of occupation, the temperature of the air being adjusted independently. In particular, it is desired to be able to send air at independently adjusted temperatures into at least one region of the front seats and into at least one region of the rear seats. The known installations allowing adjustment of the temperatures in the various regions feature a hot-air channel situated between an upper cold-air channel and a lower cold-air channel. The upper channel and the lower channel open out respectively into an upper air-mixing region, supplying the front region of the vehicle with treated air by way of distribution ducts, and into a lower air-mixing region, supplying the rear region with treated air by way of rear ducts. FR 2 778 152 A describes such an installation.

The presence of the upper cold-air channel lengthens the path for the hot air between the heating radiator and the de-icing outlet,l which is situated at the upper part of the casing, and consequently the time necessary for this air to reach this outlet. However, speed of access. by the hot air tb the de-icing outlet is an important element when rapid demisting or de-icing is required for reasons of safety.

SUMMARY OF THE INVENTION

The object of the invention is to shorten the path for the air between the heating radiator and the de-icing outlet, and, more generally, between the first source of heat or of cold and the outlets associated with the first mixing region.

The invention especially envisages an installation of the type defined in the introduction, and provides for both the second airflows to pass by underneath the first source.

Optional characteristics of the invention, which are complementary or alternative, are set out below:

the first mixing region is linked to at least one outlet associated with a front region of the passenger compartment and the second mixing region is linked to at least one outlet associated with a rear region of the passenger compartment.

the said first source is a source of heat and the treatment means further includes a source of cold which the said first and second airflows pass through before going through or bypassing the source of heat.

the casing defines a single bypass duct below the first source and means for subdividing, in the lateral direction of the casing, a second airflow having flowed in the said bypass duct into at least one first fraction directed towards the first mixing region and a second fraction directed towards The second mixing region.

the said means for subdividing the second airflow comprise a first substantially vertical partition juxtaposed laterally with the second mixing region.

the casing defines, below the first source, a first bypass duct linked to the first mixing region and a second bypass duct arriving at the second mixing region, which are mutually juxtaposed in the lateral direction of the casing, the second bypass duct and the second mixing region being separated from the first bypass duct by a first substantially vertical partition.

the said second bypass duct includes a flap being capable of being shifted between an extreme position closing off the inlet of the said second duct and another extreme position in which it prevents access by the air to a part of the first source.

the said flap extends in a continuous way in the casing so as to be shifted between an extreme position for simultaneous closing-off of the first bypass duct and of the second bypass duct, and another extreme position in which it prevents access by the air to a part of the first source.

the said flap consists of at least two flaps, the said flaps being capable of being shifted independently between an extreme position during which it simultaneously closes off a part of the first bypass duct and a part of the second bypass duct, and another extreme position in which it prevents access by the air to a part of the first source.

the said flap consists of three flaps, two of these flaps being capable of being shifted independently between an extreme position during which it closes off a part of the first bypass duct and another extreme position in which it prevents access by the air to a part of the first source, the third flap being capable of being shifted independently between an extreme position during which it closes off the second bypass duct and another extreme position where it prevents access by the air to a part of the first source.

the said first partition is connected to an intermediate wall and passes through an outer wall both extending in the lateral direction and delimiting the bypass duct or ducts, the intermediate wall separating these latter from the first source.

the said intermediate wall is capable of providing thermal insulation between the first source and the inside of the bypass duct or ducts.

the first mixing region features an extent in the lateral direction coinciding substantially with that of the bypass duct or of the set of bypass ducts, and is separated from the second mixing region by a second partition extending in this same direction and being connected to the first partition.

the casing comprises a main body housing the first source and defining the first or only bypass duct, and at least one attached piece forming the first and second partitions and defining an outlet duct extending outside the main body as far as the said other outlet.

the first and second mixing regions communicate with a single volume situated immediately downstream of the first source.

the first and second mixing regions communicate with respective volumes situated immediately downstream of the first source on either side of a separating partition extending in the lateral direction.

the said separating partition is formed by the said attached piece.

the said separating partition is able to pivot about a substantially horizontal axis so as to cause the relative size of the said respective volumes to vary.

the casing is substantially symmetric with respect to a vertical plane and defines at least one second mixing region situated in a central position and, on either side of it, at least one left-hand outlet duct and at least one right-hand outlet duct which are connected downstream of the first fixing region.

the casing is substantially symmetric with respect to a vertical plane and defines at least one outlet duct connected downstream of the first mixing region and situated in a central position and, on either side of it, a second left-hand mixing region and a second right-hand mixing region.

the casing defines, below the first source, a single bypass duct linked to the first mixing region, the bypass duct and the first mixing region featuring an extent in the lateral direction which coincides substantially with that of the first source, as well as at least one first diversion duct and a second diversion duct starting respectively from a volume situated immediately downstream of the first source and of the bypass duct so as to reach the second mixing region, the said diversion ducts and the second mixing region being offset laterally with respect to the first source.

the casing defines, below the first source, a first bypass duct linked to the first mixing region and a second bypass duct reaching the second mixing region and situated below the first bypass duct.

the said bypass ducts and the said mixing regions feature an extent in the lateral direction which coincides substantially with that of the first source, the casing further defining, below the first source, at least one diversion duct starting from a volume situated immediately downstream of the first source so as to arrive at the second mixing region, the said diversion duct being offset laterally with respect to the first source.

there is provision, in order to adjust the throughput of the first airflow at the inlet of the first mixing region, for a flap suitable for pivoting about an axis situated within the first region, this flap having a cylindrical shape with a generatrix parallel to the said axis and including, in cross section, a central, circular-arc-shaped region centred on the axis, being connected to two marginal regions which go away from the axis, the said marginal regions coming to bear on a separating wall so as to define a position for leaktight closure of the flap.

BRIEF DESCRIPTION OF THE DRAWINGS

The characteristics and advantages of the invention will be set out in greater detail in the description below, by referring to the attached drawings.

DESCRIPTION OF THE PREFERRED EMBODIMENTS

In the present description, the term "continuous" describes a component which extends substantially over the entire width of the casing, in the left-right direction of the vehicle, and which can therefore practically not be bypassed laterally by the airflow which flows in it.

Figure 1:
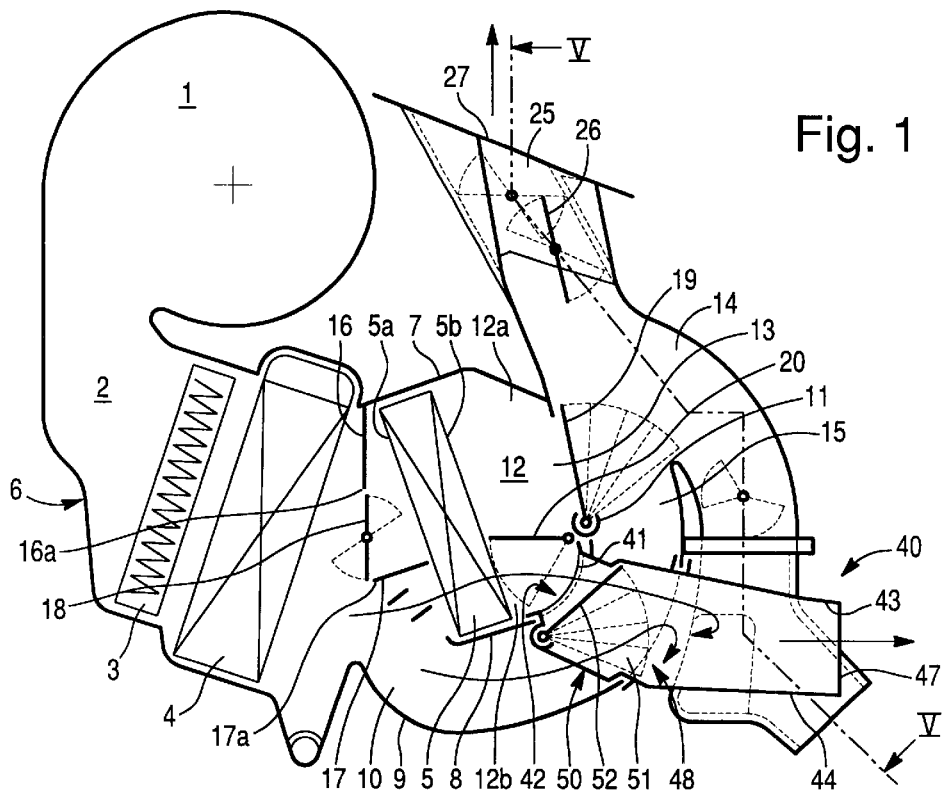
FIG. 1 is a diagrammatic view in section, along the line I—I of FIG. 5, showing the casing of an air-conditioning installation according to the invention and the essential components contained in it.
Figure 2:
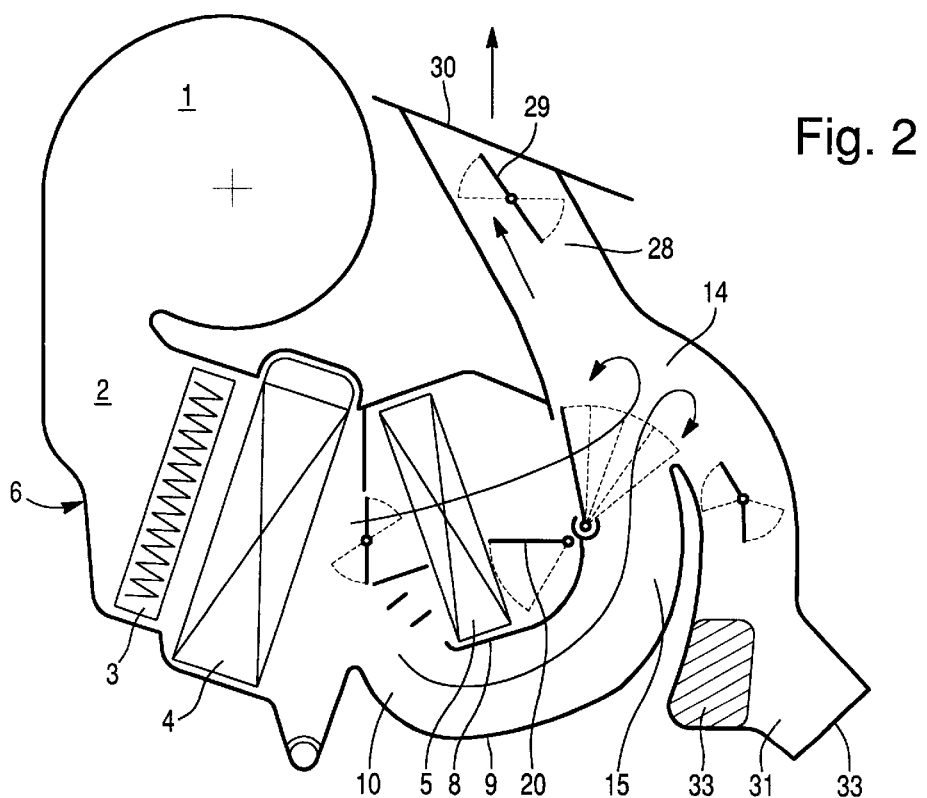
FIG. 2 is a view in section along the line II—II of FIG. 5.
Figure 5:
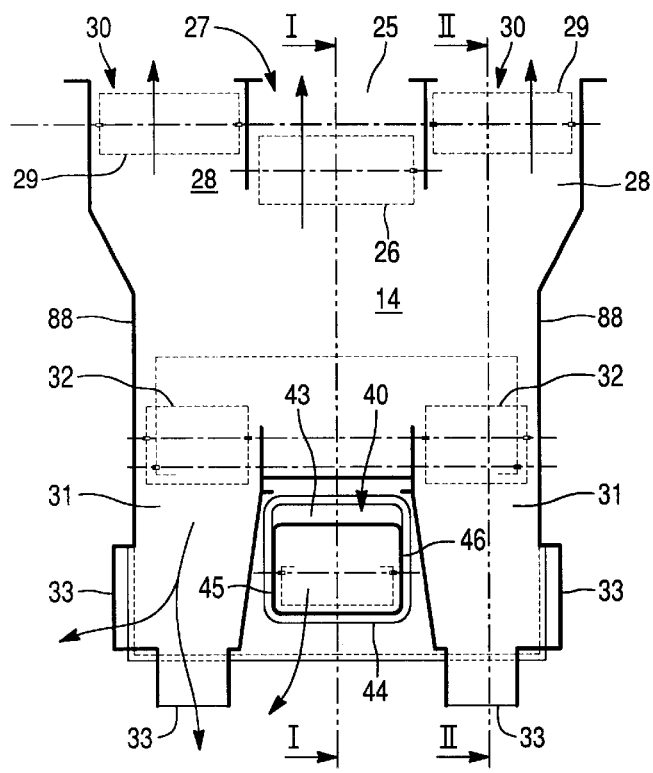
FIG. 5 is a diagrammatic view in section along the line V—V of FIG. 1.

The illustration illustrated in FIGS. 1, 2 and 5 comprises a blower 1 suitable for causing an airflow to flow in a duct 2, a filter 3 and an evaporator 4 which are arranged in the duct 2, and a heating radiator 5 arranged downstream of the evaporator 4 in the path of the airflow. These components, as well as partitions and pivoting flaps which will be described later on, are housed in a main casing body 1. The radiator 5 is continuous and extends substantially from an upper wall 7 as far as an intermediate wall 81 themselves continuous. The intermediate wall 8, with a lower wall 9 of the body 6, delimits a continuous bypass duct 10 which passes below the radiator 5. The radiator 5 is oriented in such a way that its front face 5a or air-inlet face and its rear face 5b or air-outlet face form a small angle with the vertical. The upper wall 7 is extended to the rear of the radiator, and the intermediate wall 8 is also extended rearwards, rising up opposite the face 5b, as far as a horizontal upper edge 11. The walls 7 and 8 between them delimit a volume 12 adjacent to the face 5b, communicating directly via an aperture 13 with a first mixing region 14. The aperture 13 is continuous and extends, in height, from the edge 11 up to the level of the wall 7.

The wall 9 is also extended to the rear of the radiator 5 curving upwards so as, with the extension of the intermediate wall 8, to delimit a rear duct 15 which communicates with the bypass duct 10 and reaches the mixing region 14. A continuous partition 16 extends downwards from the upper wall 7, between the evaporator 4 and the front face 5a of the radiator, its lower edge 16a being situated at a certain distance above the front edge 17a of a continuous partition 17 which extends forwards from the face 5a. The interval between the edges 16a and 17a can be closed off or freed by a butterfly-type mixing flap 18. The flap 18 is controlled in synchronism with another mixing flap 19, of flag type, mounted pivoting about an axis extending along the edge 11, between an extreme position, represented in solid line in FIGS. 1 and 2, in which it closes off the aperture 13, and another extreme position in, which it closes off the outlet from the duct 15 towards the mixing region 14. Another flap 20 of the flag type, continuous like the flaps 18 and 19, the rotational axis of which is close to the edge 11 and the opposite edge of which is close to the face 5b, subdivides the volume 12 in a non-leaktight way between an upper sub-volume 12a and a lower sub-volume 12b.

As can be seen in FIG. 5, the continuous mixing region 14 communicates upwards with a central outlet duct 25 containing an adjusting flap 26 and arriving at a de-icing outlet 27, and with left-hand and right-hand outlet ducts 28 containing adjusting flaps 29 and arriving at outlets 30 intended for the aeration of the left-hand and right-hand parts of the passenger compartment of the vehicle.

Likewise, the mixing region 14 communicates downwards with left-hand and right-hand outlet ducts 31, which pass behind the duct 151 containing adjusting flaps 32 and arriving at various outlets 33 serving the feet regions of the front seats of the vehicle.

The casing of the installation, in addition to the main body 6, comprises an attached piece 40 which has the general shape of a tube with variable rectangular section. The piece 40 extends over a central part of the width of the casing, midway between the lower outlet ducts 31. The tube 40 is oriented substantially in the front-rear direction, its front extremity 41 lying within an aperture 42 formed for this purpose in the partition 8, in such a way that the inside of the tube communicates with the sub-volume 12b. The tube 40 consists of an upper wall 43, of a lower wall 44 and of vertical left-hand and right-hand walls 45, 46, the walls 43, 45 and 46 extending from the edges of the aperture 42 to the rear extremity 47 of the tube, forming an outlet aperture, and passing through an aperture 48 formed for this purpose in the outer wall 9 of the body 6, and the wall 44 extending from the lower edge of the aperture 48 to the rear extremity 47. The inside of the tube 40 therefore communicates on the one hand with the sub-volume 12b via the aperture 42, and on the other hand with the bypass duct 10 through an aperture 50 extending between the lower edge of the aperture 42 and the front edge of the wall 44. The interior of the tube thus forms a second mixing region 51 capable of receiving air heated by the radiator 5 and unheated air originating from the duct 10. A mixing flap 52 housed in the region 51 can be shifted between an extreme position illustrated in solid line in FIG. 1, in which it closes off the heated-air inlet, and an extreme position indicated in broken line in which it closes off the cold-air inlet. The mixed air leaving through the outlet 47 is sent into a region of the passenger compartment other than those served from the mixing region 14, for example towards the rear seats.

The invention makes it possible to adjust the temperature of the air independently in the two mixing regions, while providing a hot-air path towards the de-icing aperture 27 which is as short as possible having regard to the space reserved for the casing in the vehicle.

In order to reach the mixing region 14, the cold air originating from the duct 101 passes laterally on either side of the piece 40. The flap 20, depending on its position, makes it possible to channel the hot air either partly towards the mixing region 14 and partly towards the mixing region 51, or entirely towards the mixing region 14.

FIGS. 3, 4, 6 and 7 illustrate illustrations, not in accordance with the invention, and show that it is possible, by minor reconfigurations of the same tooling, to obtain a casing for an installation according to the invention and casings for simplified installations intended for other versions of the same basic vehicle.

More precisely, for these other installations, the mould serving for producing the main body 6 of the casing is modified, by elimination of removable elements, so as to dispense with the apertures 42 and 48, the attached piece 40 also being dispensed with, as well as the flap 52 mounted in it and the flap 20. The air originating both from the volume 12 situated downstream of the radiator 5 as well as from the bypass duct 10 arrives exclusively in the mixing region 14.

Figure 3:
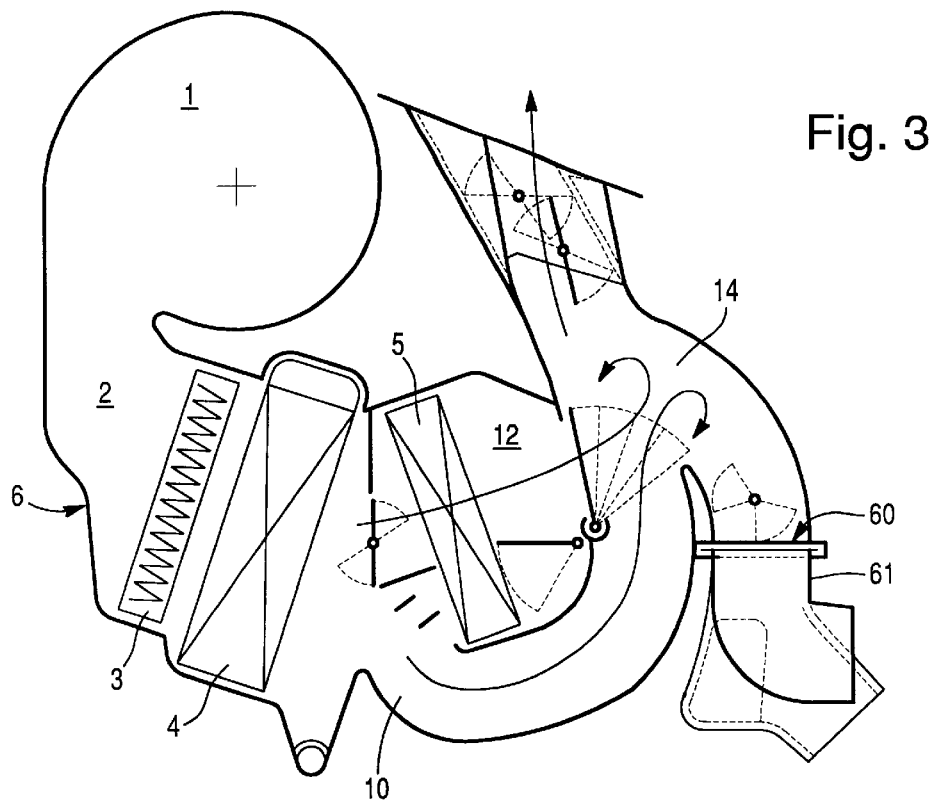
FIGS. 3 and 4 are views similar to FIG. 1, showing modified casings which can be obtained by a minor re-configuration of the tooling serving for manufacturing the casing represented in FIG. 1.
Figure 6:
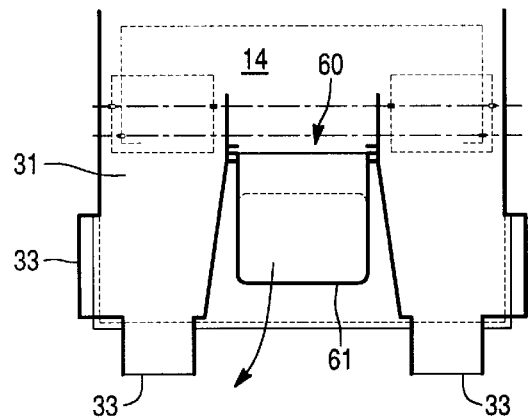
FIGS. 6 and 7 are views similar to FIG. 5, showing the casings of FIGS. 3 and 4 respectively.

In the case of the casing of FIGS. 3 and 6, another modification of the mould makes it possible to form an aperture 60 at the base of the region 14, between the two ducts 31, on which is mounted an attached piece 61 defining an outlet duct which can be connected to the passenger compartment in the same way as the tube 40. This simplified installation makes it possible to feed the same regions of the passenger compartment as those described above, but with air at the same temperature as that feeding the other regions.

Figure 4:
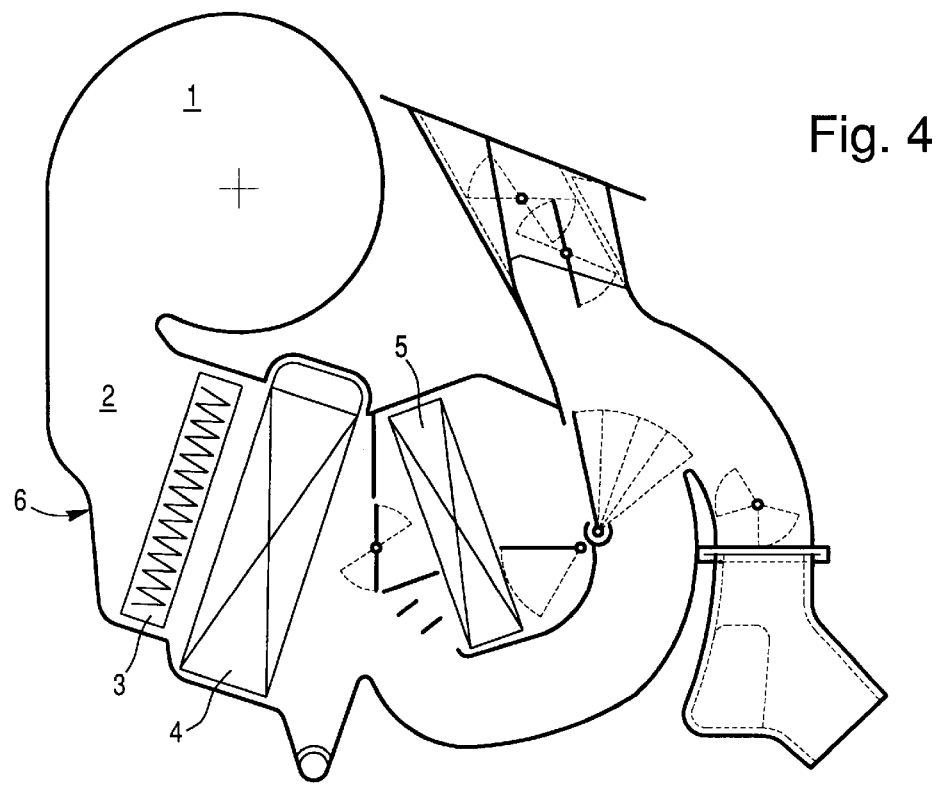
Figure 7:
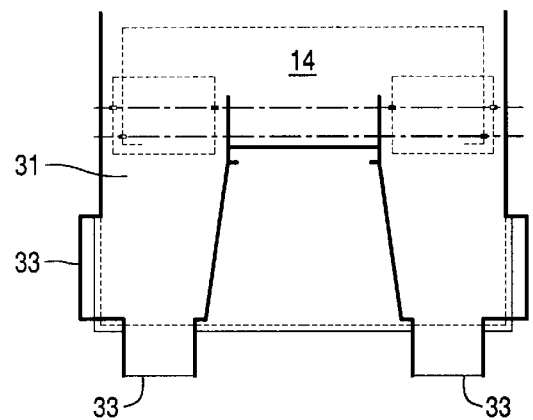

In the casing of FIGS. 4 and 7, in contrast, the aperture 60 and the piece 61 do not exist. This results in a further simplified installation possessing only the outlet ducts 25, 28 and 31.

FIG. 8 onwards again illustrate air-conditioning installations according to the invention.

Figure 8:
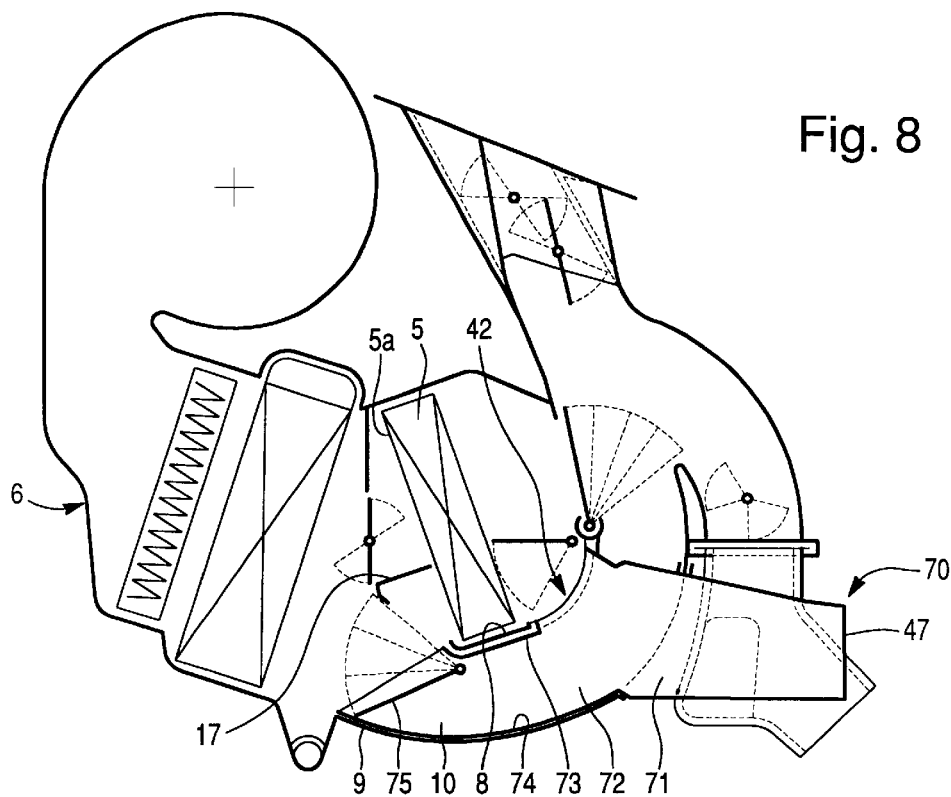
FIGS. 8 to 15 are views similar to FIG. 1, relating to variants of the installation.

In the casing of FIG. 8, the attached piece 40 described in connection with FIGS. 1 and 5 is replaced by a piece 70 defining, in addition to a tube 71 extending as above from the aperture 42 to the outlet aperture 47, another tube 72 being connected to the tube 71 and engaging in the bypass duct 70 of which it occupies the entire height as far as its upstream extremity. The tube 72, to that end, features an upper wall 73 adjacent to the intermediate partition 8, and a lower wall 74 adjacent to the lower wall 9 of the body 6 of the casing, which are linked together by extensions towards the front of the vertical lateral walls 45, 46 (FIG. 5). The mixing flap 52 is replaced by a flag flap 75 mounted on the piece 70 at the upstream extremity of the tube 72 and being capable of being shifted between an extreme position in which it closes off the inlet thereof and another extreme position in which it prevents access by the air to the part of the inlet face 5a of the radiator 5 situated below the partition 17.

Figure 8A:
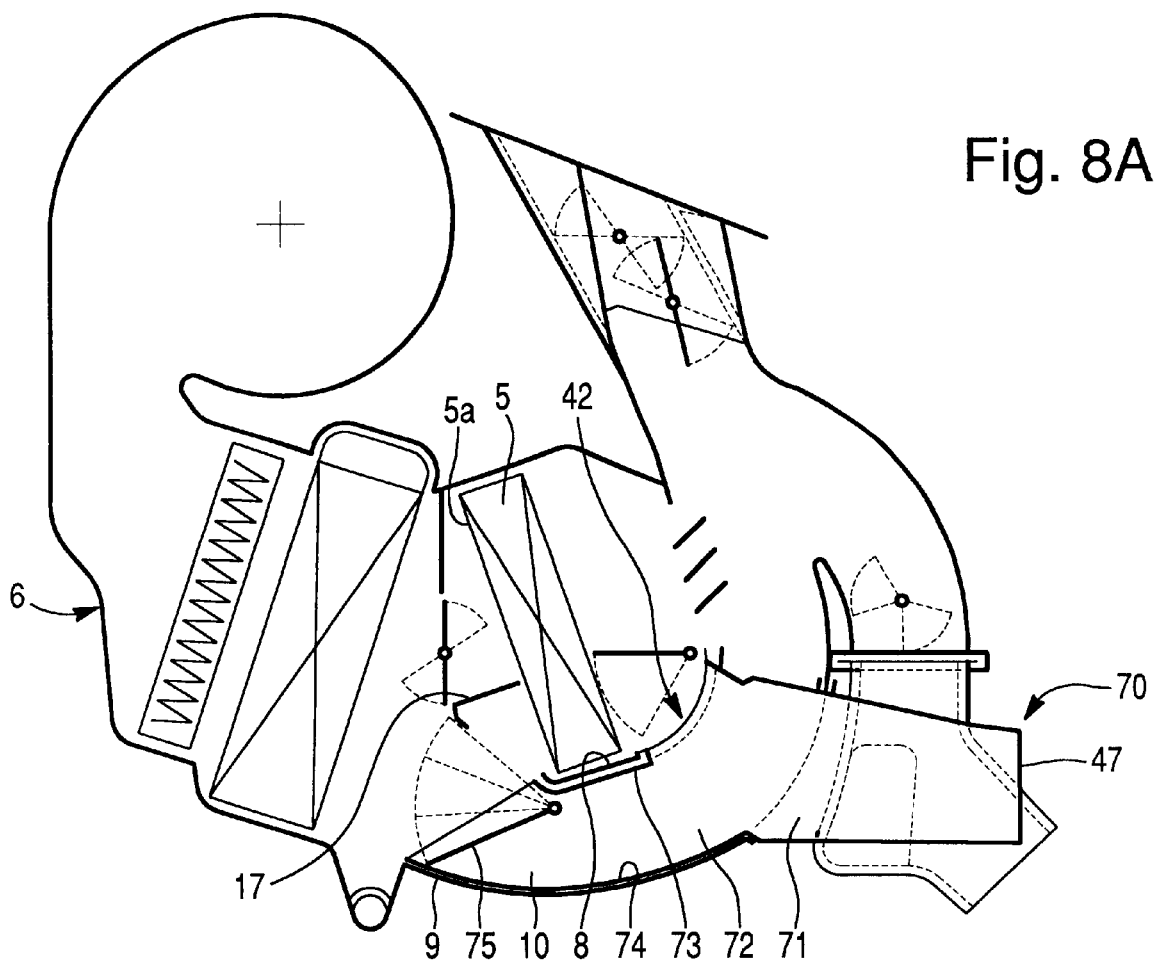
Figure 8B:
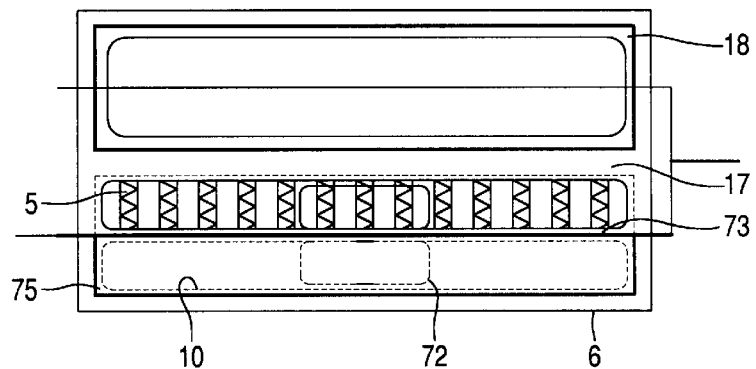
Figure 8C:
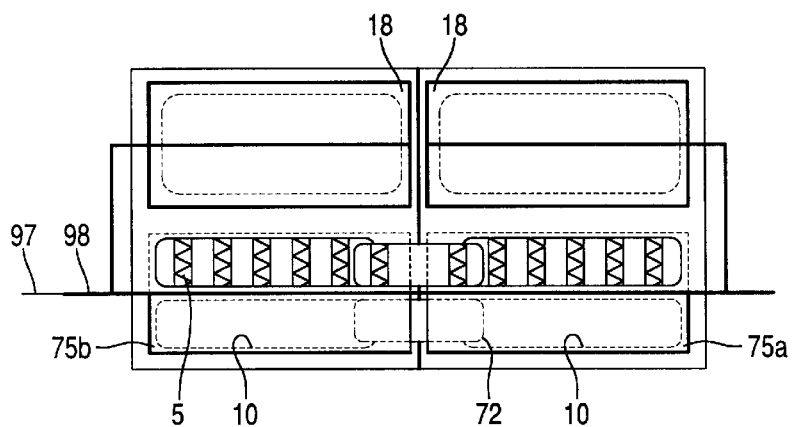

The installation represented in FIG. 8a is a variant design of FIG. 8. In fact, the flap 19 is dispensed with in favour of the flap 75 which can be represented in three versions. This flap 75 is represented in FIGS. 8A, 8B and 8C linked to the flap 18 in such a way that their movements take place at the same time. In this figure have also been represented the partitions 17 and 73 delimiting the first and the second duct 10 and 72, as well as the inlet to the radiator 5.

FIG. 8B more particularly and diagrammatically illustrates the basic version of the flap 75 which extends over the entire width of the casing 6 in such a way as to close off simultaneously the first bypass duct 10 and the second bypass duct 72. The flap 75 is shifted from an extreme position in which it simultaneously closes off the first bypass duct 10 and the second bypass duct 72 to another extreme position in which it prevents access by the air to a part of the radiator 5 (position represented in broken lines).

A second version of the flap 75, illustrated in FIG. 8C, advantageously employed in an installation with two independent temperature regions, the latter is split so as to form two flaps 75a and 75b, coaxial or otherwise, having the faculty of simultaneously closing off a part of the first bypass duct 10 and a part of the second bypass duct 72. The temperature of the air flowing in the second bypass duct 712 is then a function of the opening of the flaps 75a and 75b.

These latter are shifted from an extreme position in which they simultaneously close off a part of the first bypass duct 10 and a part of the second bypass duct 72 to another extreme position in which it prevents access by the air to a part of the radiator 5 (position represented in broken lines).

Figure 8D:
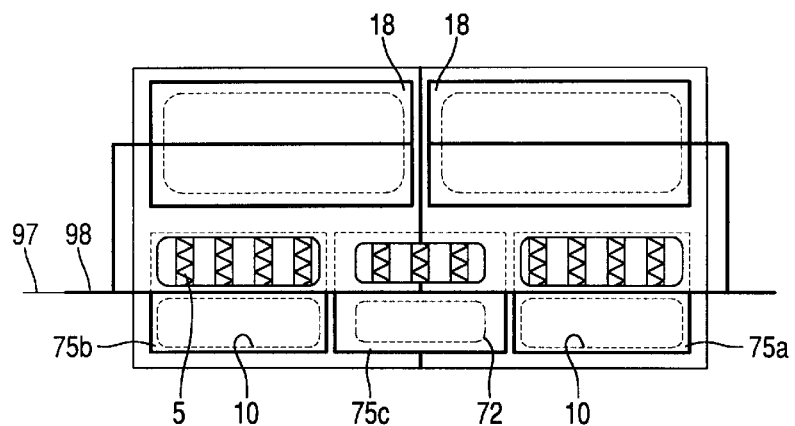

In a third version of the flap 75 illustrated in FIG. 8d and advantageously used in an installation with three independent temperature regions, the latter is split into three independent entities 75a, 75b, 75c, which are coaxial or otherwise. Two of these entities 75a and 75b handle the air flow which has to flow in the two parts of the first bypass duct 10 which are situated on each side of the second bypass duct 72. The latter, for its part, is more or less closed off by the third entity 75c of the flap 75. The entity 75a is shifted from a first extreme position in which it closes off a part of the first bypass duct 10 to another extreme position in which it prevents access by the air to a part of the radiator 5 (position represented in broken lines). The entity 75b is shifted from an extreme position in which it closes off a part of the first bypass duct 10 to another extreme position in which it prevents access by the air to a part of the radiator 5 (position represented in broken lines). The entity 75c is shifted from an extreme position in which it closes off the second bypass duct 72 to another extreme position in which it prevents access by the air to a part of the radiator 5 (position represented in broken lines). In the case of the designs illustrated in FIGS. 8C and 8D, it will be understood that the flaps 75a, 75b and 75c can be coaxial via the set of axes 97 and 98 of different diameters threaded into one another. However, these axes may also not be coincident, by arranging them at two or three different points in such a way as to solve the problems of architectural bulk of the installation.

Figure 9:
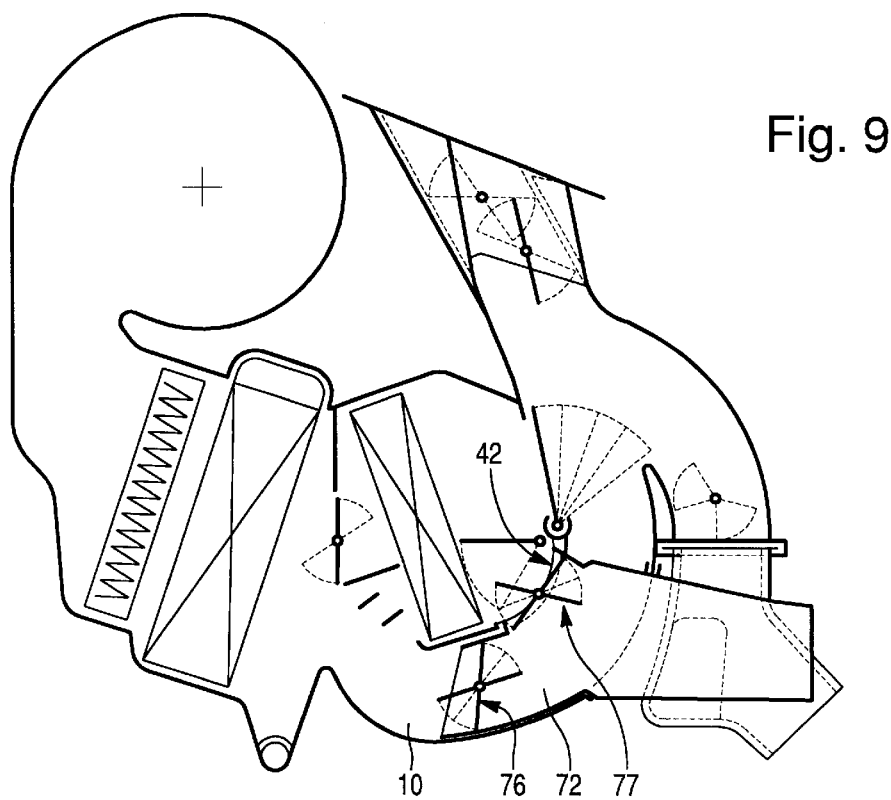

The installation of FIG. 9 differs from that of FIG. 8 in that the tube 72 of the attached piece 70 is shorter and extends over only a part of the length of the bypass duct 10. The mixing flap 75 is replaced by two butterfly flaps 76, 77 capable of closing off or freeing respectively the inlet of the tube 72 and the aperture 42.

Figure 10:
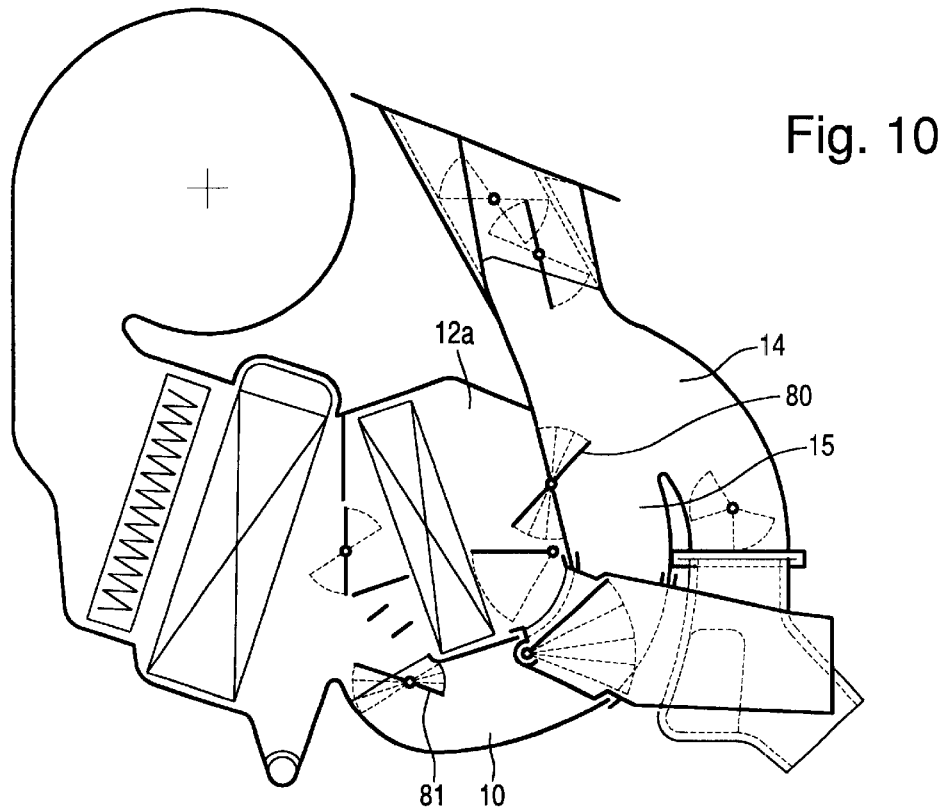

The installation illustrated in FIG. 10 differs from that of FIG. 1 in that the mixing flap 19 of flag type is replaced by a flap 80 of butterfly type which can close off or free the passage aperture between the sub-volume 12a and the mixing region 14, but cannot close off the outlet from the cold-aid duct 15 to this same region. Another butterfly flap 81 is added there, suitable for closing off or for freeing the inlet of the second bypass duct 10.

Figure 11:
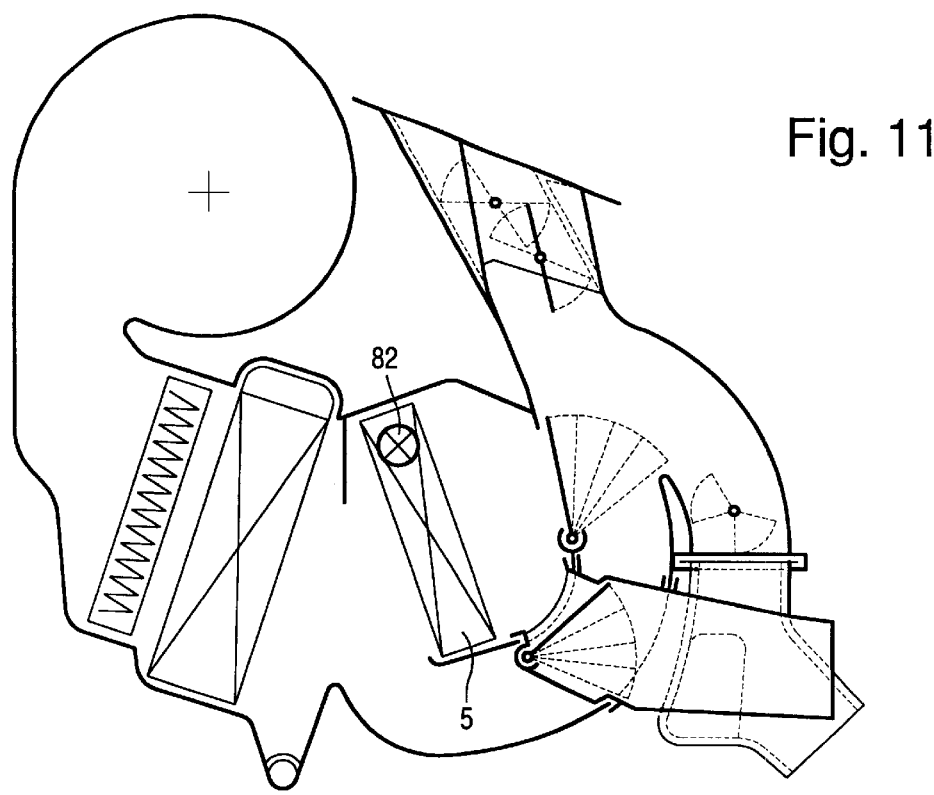

The installation illustrated in FIG. 11 differs from that of FIG. 1 in dispensing with the partition 17 and the flaps 18 and 20, and in the addition of a cock 82 making it possible to interrupt the hot-fluid circulation in the radiator 5.

Figure 12:
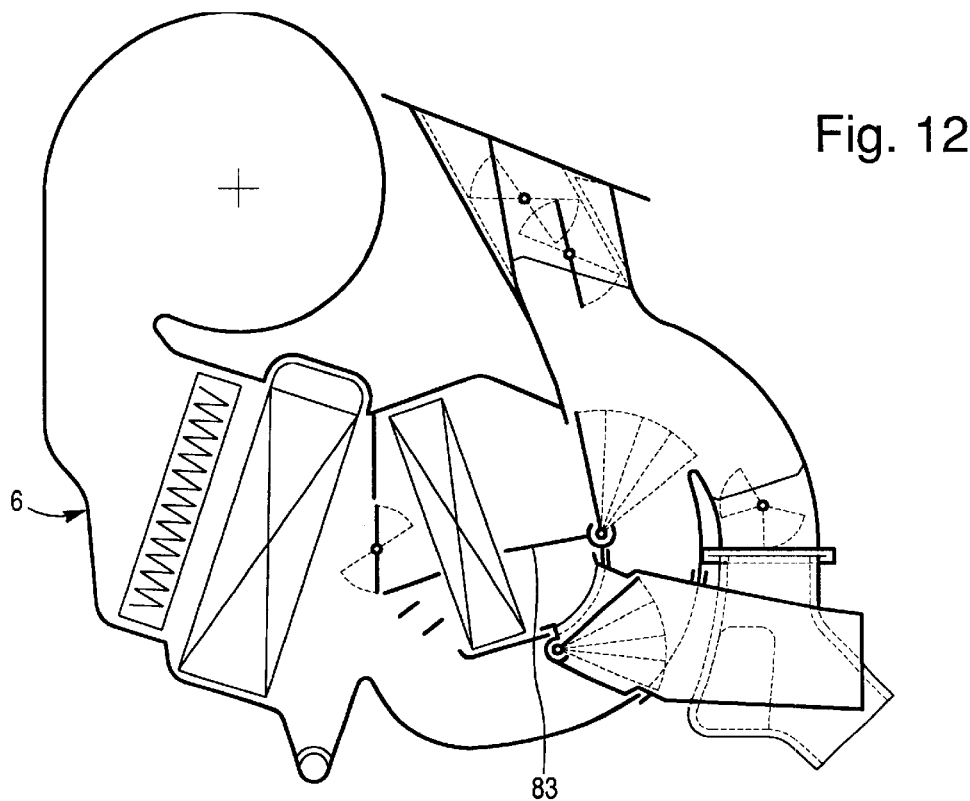

The installation according to FIG. 12 differs from that of FIG. 1 in that the flag flap 20 separating the sub-volumes 12a and 12b is replaced by a fixed partition 83 belonging to the main body 6 of the casing.

Figure 13:
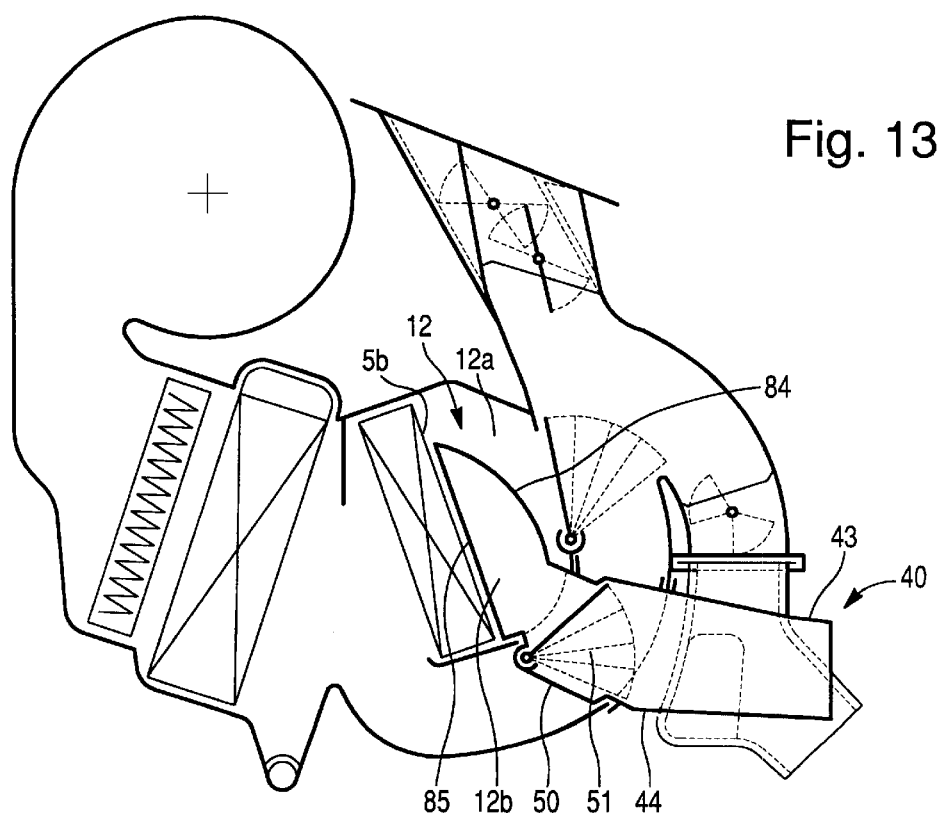

In the installation of FIG. 13, this same flap is also replaced by a fixed partition 84, which this time belongs to the attached piece 40 and which here consists of an extension of the upper wall 43 of it. The lower wall 44, beyond the aperture 50, and the side walls 45 and 46 (FIG. 5) are also extended within the volume 12, so as to define for the tube 40 a hot-air inlet aperture 85 adjacent to the outlet face 5b of the radiator. The sub-volume 12b linked to the mixing region 51 is therefore situated within the tube 40 and thus extends over the width of it, and no longer over the entire width of the casing. In this variant, the partition 17 and the flap 18 are also dispensed with.

Figure 14:
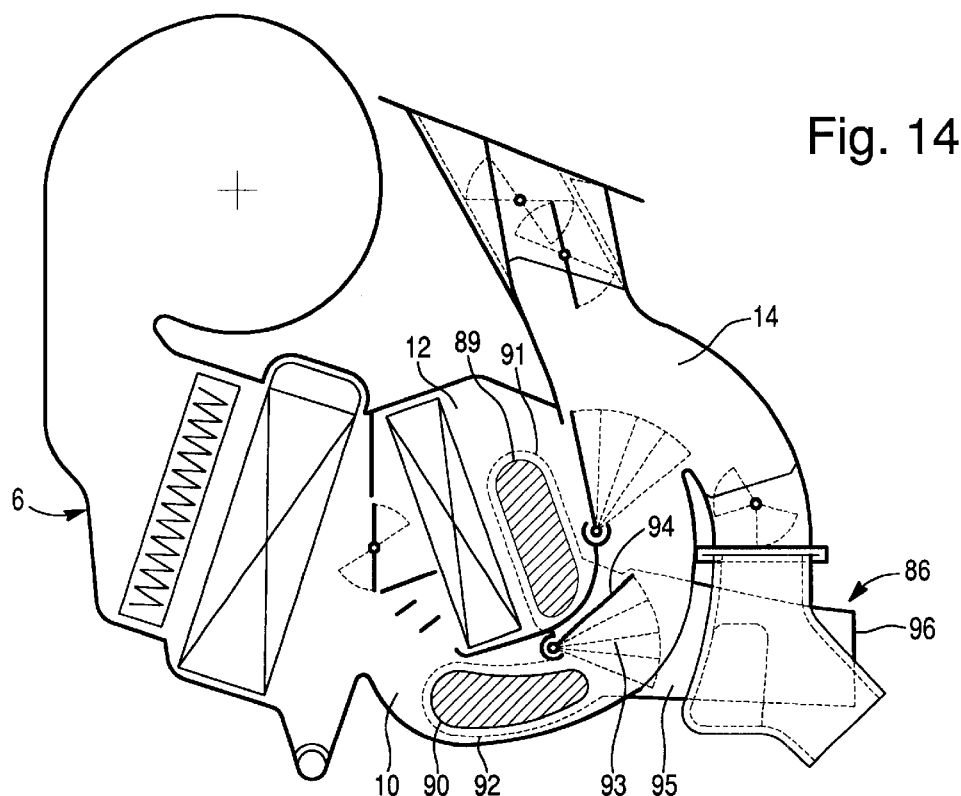

The installation according to FIG. 14 deviates from that of FIG. 1 by the elimination of the flap 20, and by the replacement of the attached piece 40 by at least one attached piece 86 being fixed externally onto one of the lateral faces 88 (FIG. 5) of the main body 6 of the casing. The apertures 42, 48 which are provided for the passage of the piece 40 are also dispensed with, and other apertures 89, 90 are formed in the wall 88, adjacent to the volume 12 and to the bypass duct 10 respectively. The piece 86 is therefore situated outside the lateral extent of the body 6 and defines a hot-air inlet duct 91 adjacent to the aperture 89, a cold-aid duct 92 adjacent to the inlet 90, a mixing region 93 containing a mixing flap 94 for the metered mixing of the airflows originating from these two ducts, and an outlet duct 95 going from the region 93 to an outlet aperture 96. In this variant, the cold air flows as far as the upper mixing region 14 continuously over the entire width of the body 6. Advantageously, two attached pieces 86 are provided, mounted on either side of the body 6 and supplying treated air to different regions of the passenger compartment. The corresponding mixing flaps 94 can be controlled independently of one another for a differentiated adjustment of the temperature.

Figure 15:
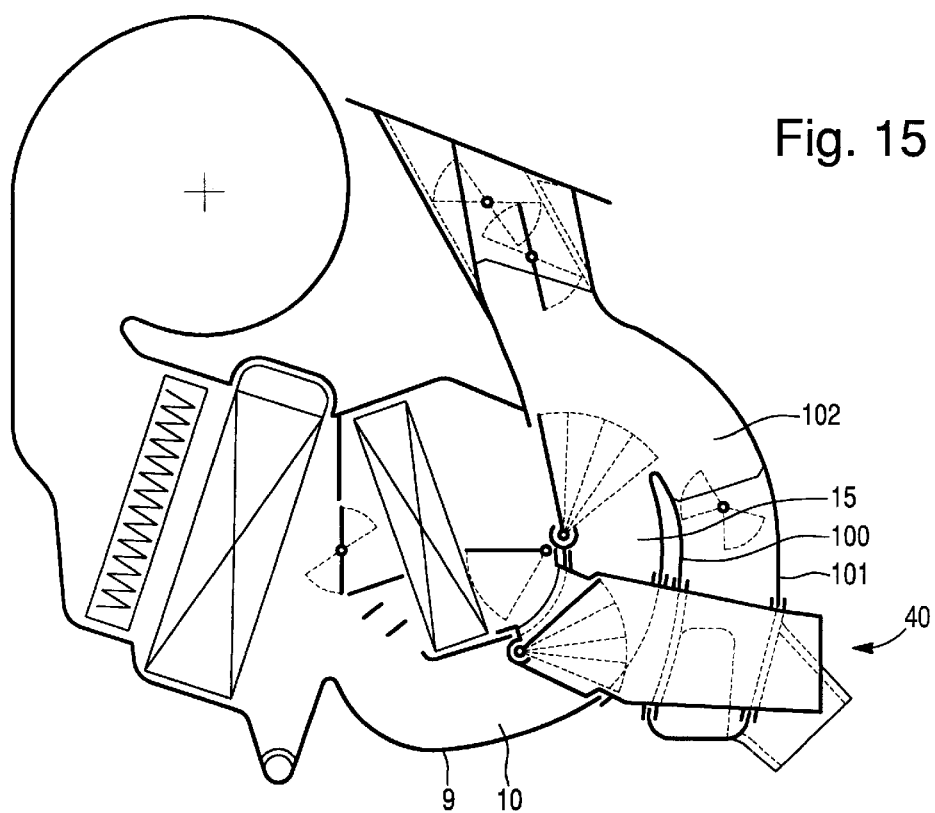

In FIG. 15 is again found an attached piece 40 similar to that of FIG. 1, which this time passes, in a leaktight manner, through not only the outer wall 9 delimiting the ducts 10 and 15, but also the front and rear walls 100, 101 of a continuous outlet duct 102 replacing the left-hand and right-hand outlet ducts 31 of FIG. 5.

Figure 16:
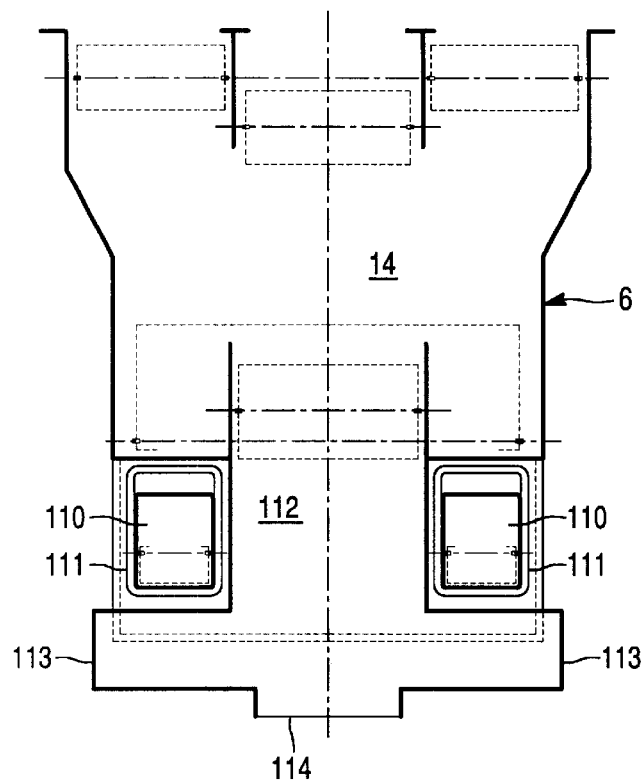
FIGS. 16 to 18 are views similar to FIG. 5, relating to other variants.

FIG. 16 shows a configuration of the lower outlet ducts which is reversed by comparison with that of FIG. 5, of the left-hand and right-hand ducts 110, which are defined by respective attached pieces 111, similar to the piece 40 and housing respective mixing flaps, framing a single duct 112 defined by the main body 6 of the casing and linked to the upper mixing region 14. In the example illustrated, the duct 112 is linked to two lateral outlet apertures 113 and to a central outlet aperture 114.

Figure 17:
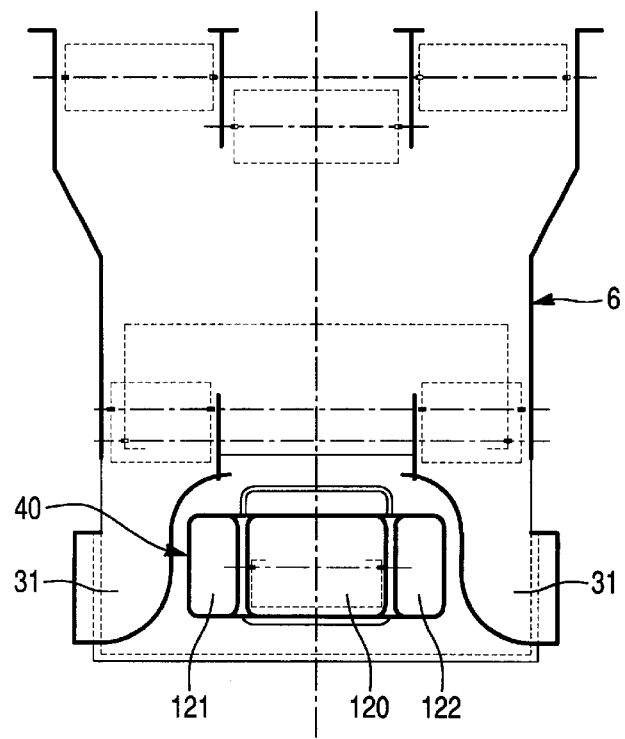

In the embodiment of FIG. 17, the attached piece 40 is modified so as to define, in addition to a central outlet duct 120, two outlet ducts 121, 122 arranged laterally on either side of it, these three ducts being linked to the same mixing region 51 (FIG. 1). The lateral outlet ducts 31 of the body 6 are narrowed so as to accommodate the piece 40 thus widened.

Figure 18:
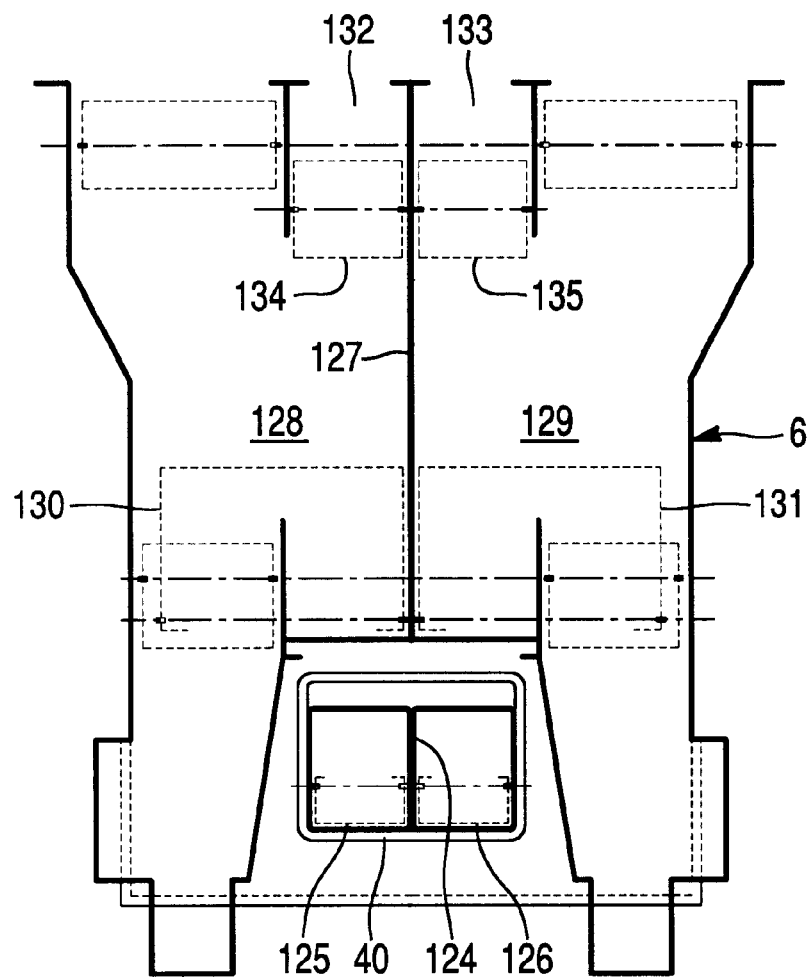

In the variant of FIG. 18, the attached piece 40 is similar as regards its external configuration to that of FIGS. 1 and 5, but the tube which it defines is divided internally, over its entire length, by a vertical partition 124. On either side of the partition 124 are formed two mixing regions containing respective mixing flaps 125, 126, and two outlet ducts intended to serve left-hand and right-hand regions of the passenger compartment. The casing body 6 is also divided by a central vertical partition 127, on either side of which are defined two mixing regions 128, 129 replacing the mixing region 14 and containing respective mixing flaps 130, 131, and two outlet ducts 132, 133 replacing the duct 25 and containing respective adjusting flaps 134, 135.

Figure 19:
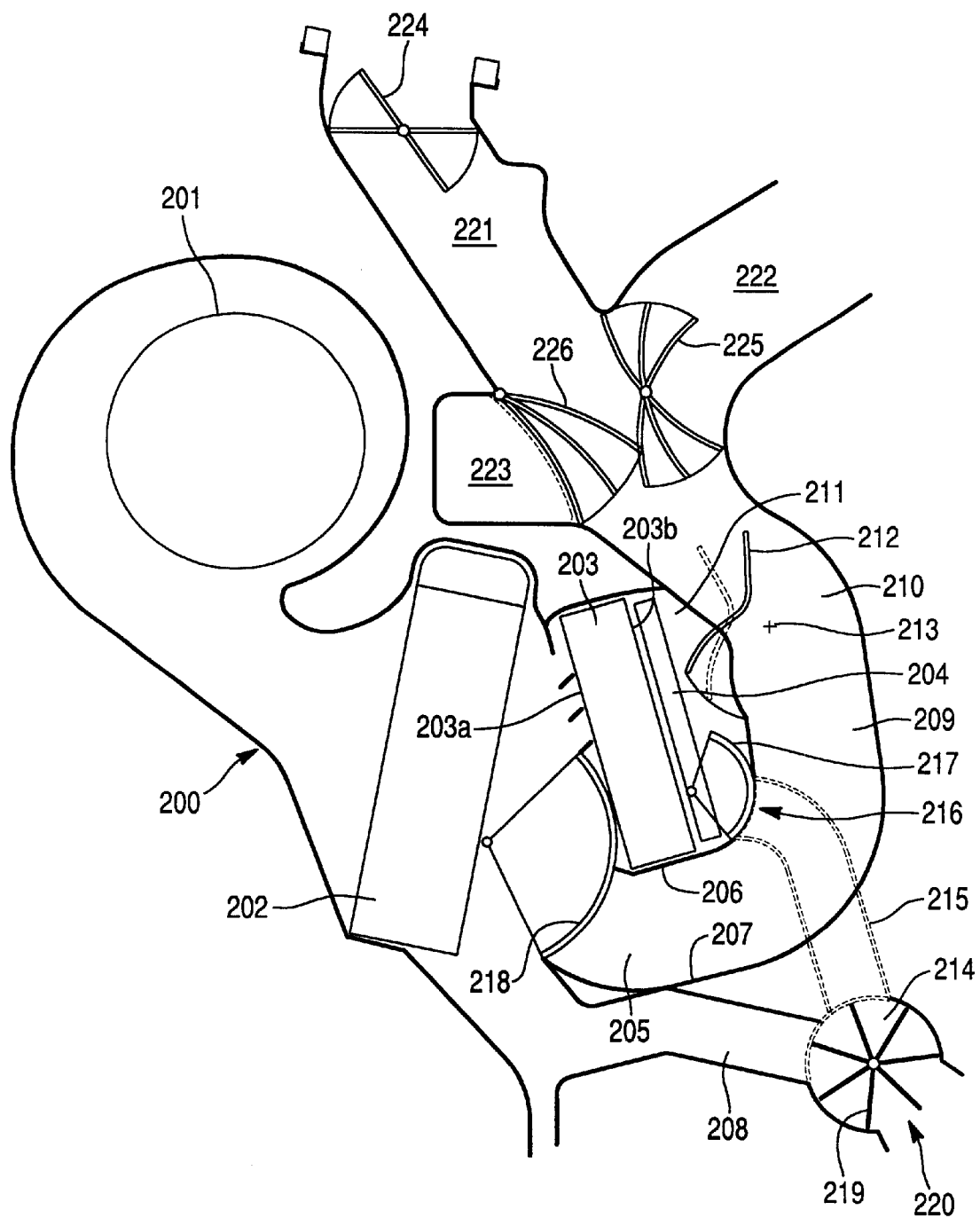
FIG. 19 is a view similar to FIG. 2, relating to another installation according to the invention.

The casing 200 of the installation forming the subject of FIG. 19 contains a blower 201, an evaporator 202 and a heating radiator 203, the relative arrangement of which is similar to that illustrated in FIG. 1. On the downstream face 203b of the radiator 203 is furthermore placed an auxiliary heat source 204 such as an electrical resistance element with positive temperature coefficient. The casing 200, below the radiator 203, delimits two superimposed bypass ducts, namely a duct 205 delimited by an intermediate wall 206 adjacent to the radiator and by a lower wail 207, and a duct 208 arranged below the duct 205. The walls 206 and 207 are curved rearwards and upwards so as to delimit an ascending downstream part 209 of the duct 205 which arrives at a first mixing region 210. The mixing region 210 is situated immediately behind the upper half of the hot-air volume 211 adjacent to the face 203b, and can be separated from this volume or put into communication with it by a mixing flap 212 of curvilinear shape and off-centre with respect to its axis of rotation 213 situated within the region 210.

The duct 208 arrives at a second mixing region 214 which is also linked to the volume 211 by way of one or two hot-air ducts 215 which laterally bypass the duct 205–209, and which communicate with the volume 211 via an aperture 216 formed in the wall 206 and adjacent to the lower part of the volume 211. The aperture 216 can be closed off or freed by a drum flap 217 housed in the volume 211. Another drum flap 218 makes it possible to close off either the inlet of the duct 205, or the access to the lower half of the upstream face 203a of the radiator 203. The mixing region 214 contains a mixing flap 219 of butterfly type and is linked to an outlet aperture 220 which plays the same role as the outlet aperture 47 of the installation of FIG. 1. Furthermore, the air mixed in the region 210 can be sent to various upper outlet ducts 221, 222, 223 equipped with adjusting flaps 224, 225, 226.

Figure 20:
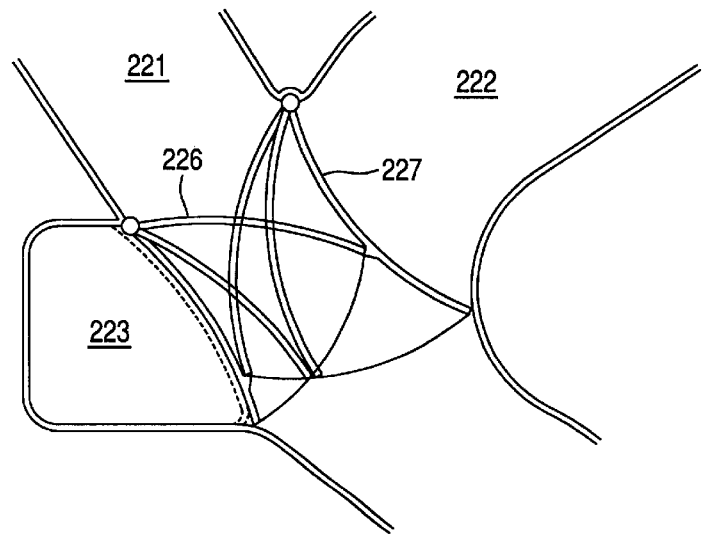
FIGS. 20 to 24 are details of FIG. 19 revealing modifications of the installation.

FIG. 20 is a partial view of a variant of the installation of FIG. 19, in which the butterfly flap 225 controlling the inlet of the duct 222 is replaced by a flag flap 227 similar to the flap 226 which controls the inlet of the duct 221.

Figure 21:
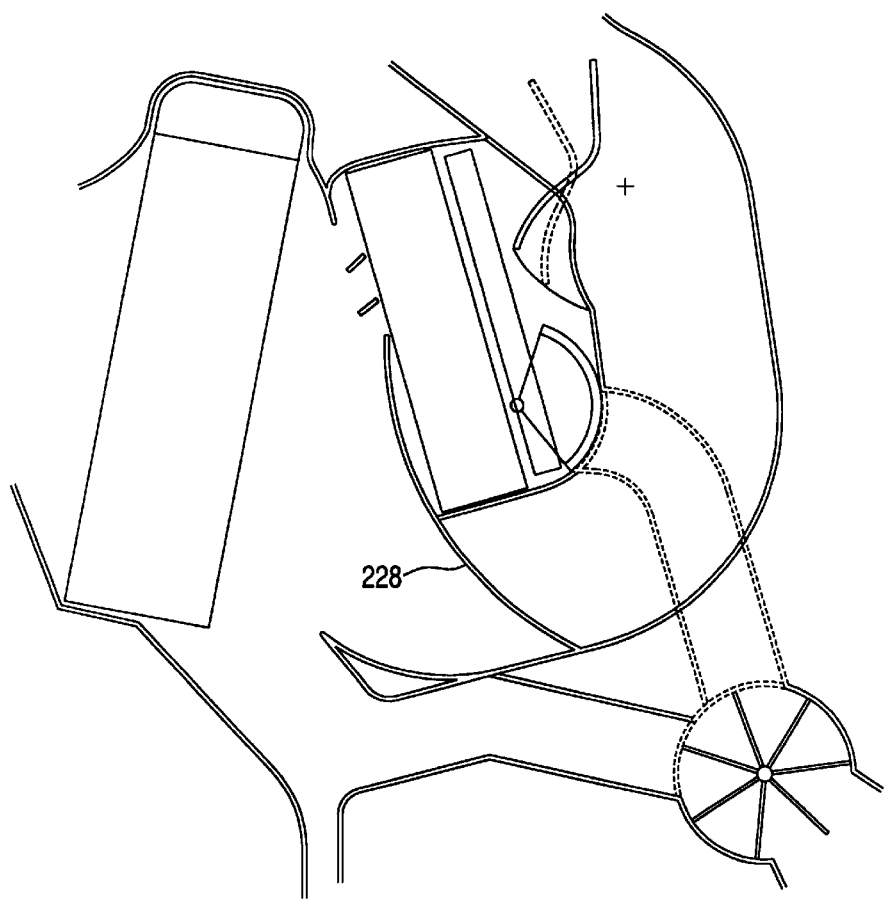

In the variant o f FIG. 21, the drum flap 218 of FIG. 19, the concavity of which is turned towards the front, is replaced by a drum flap 228 having the same function and the concavity of which is turned towards the rear.

Figure 22:
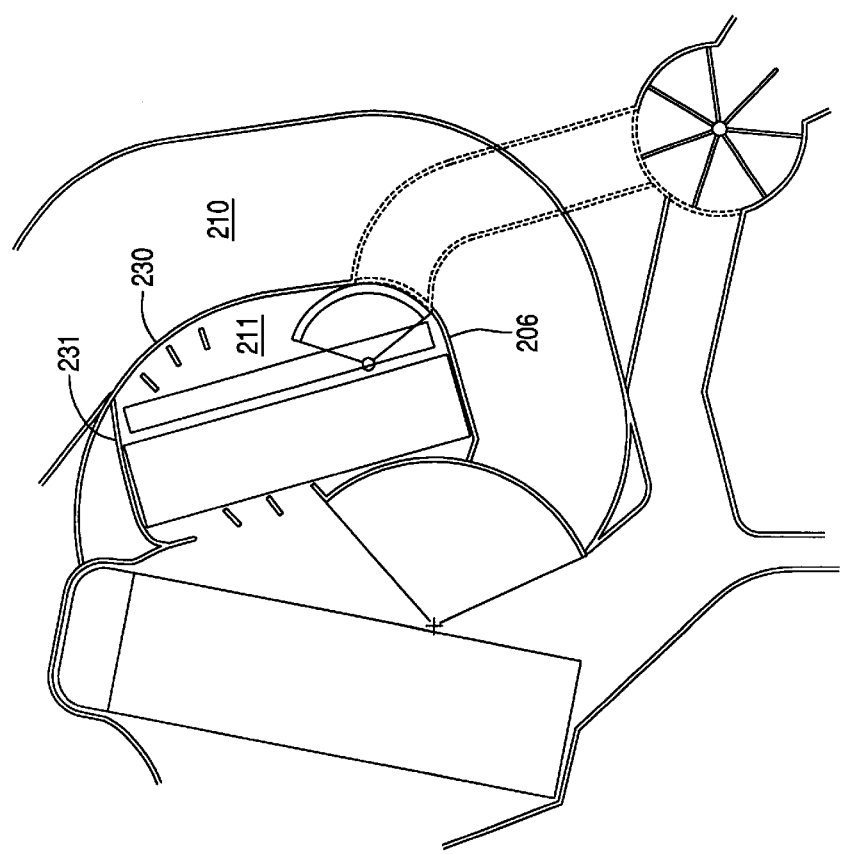

In the variant of FIG. 22, it is the mixing flap 212 which is replaced by a drum flap 230 which may either close off the passage between the hot-air volume 211 and the mixing region 210, by being placed in the extension, upwards and forwards, of the wall 206, or free this passage by being withdrawn above the upper wall 231 of the volume 211.

Figure 23:
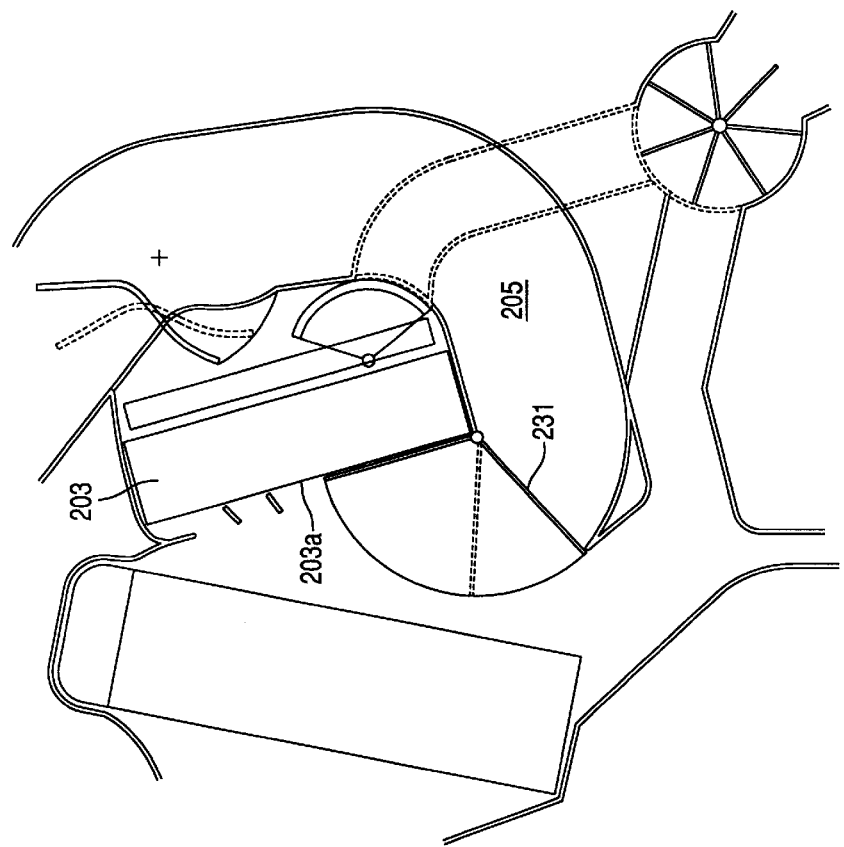

In FIG. 23, the drum flap 218 is replaced by a flag flap 232 which can be shifted between an extreme position in which it closes off the inlet of the bypass duct 205 and an extreme position in which it covers the lower half of the inlet face 203a of the radiator 203.

Figure 24:
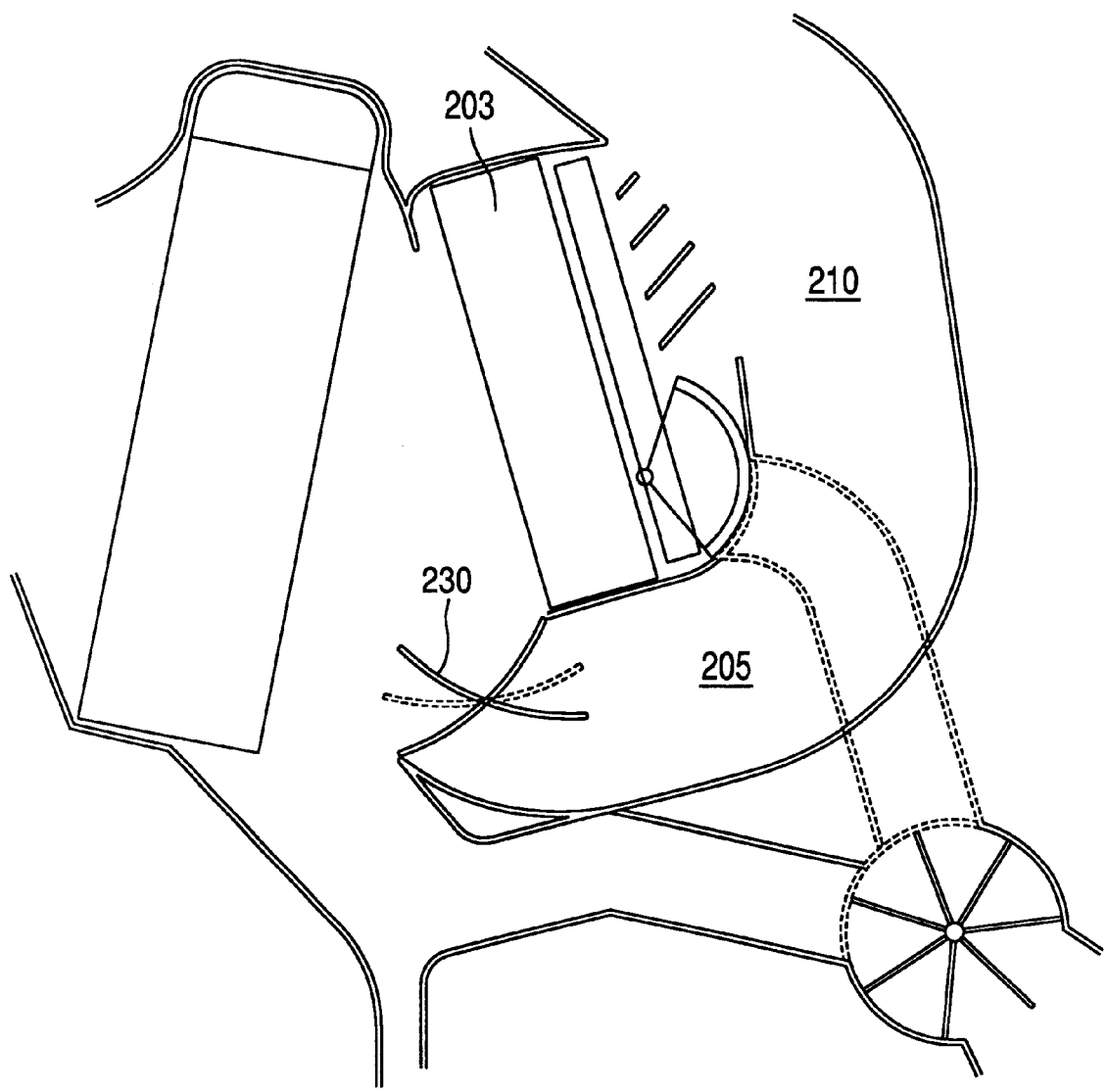

In the variant of FIG. 24, the drum flap 218 is replaced by a curvilinear butterfly flap 230 which can close off or free the inlet of the bypass duct 205. The mixing flap 212 is dispensed with, so that the mixing region 210 is always fed with air through the radiator 203. It is necessary to provide a cock in order to interrupt the supply from the radiator 203 of heat-carrying fluid when the region 210 is not to receive hot air.

Figure 25:
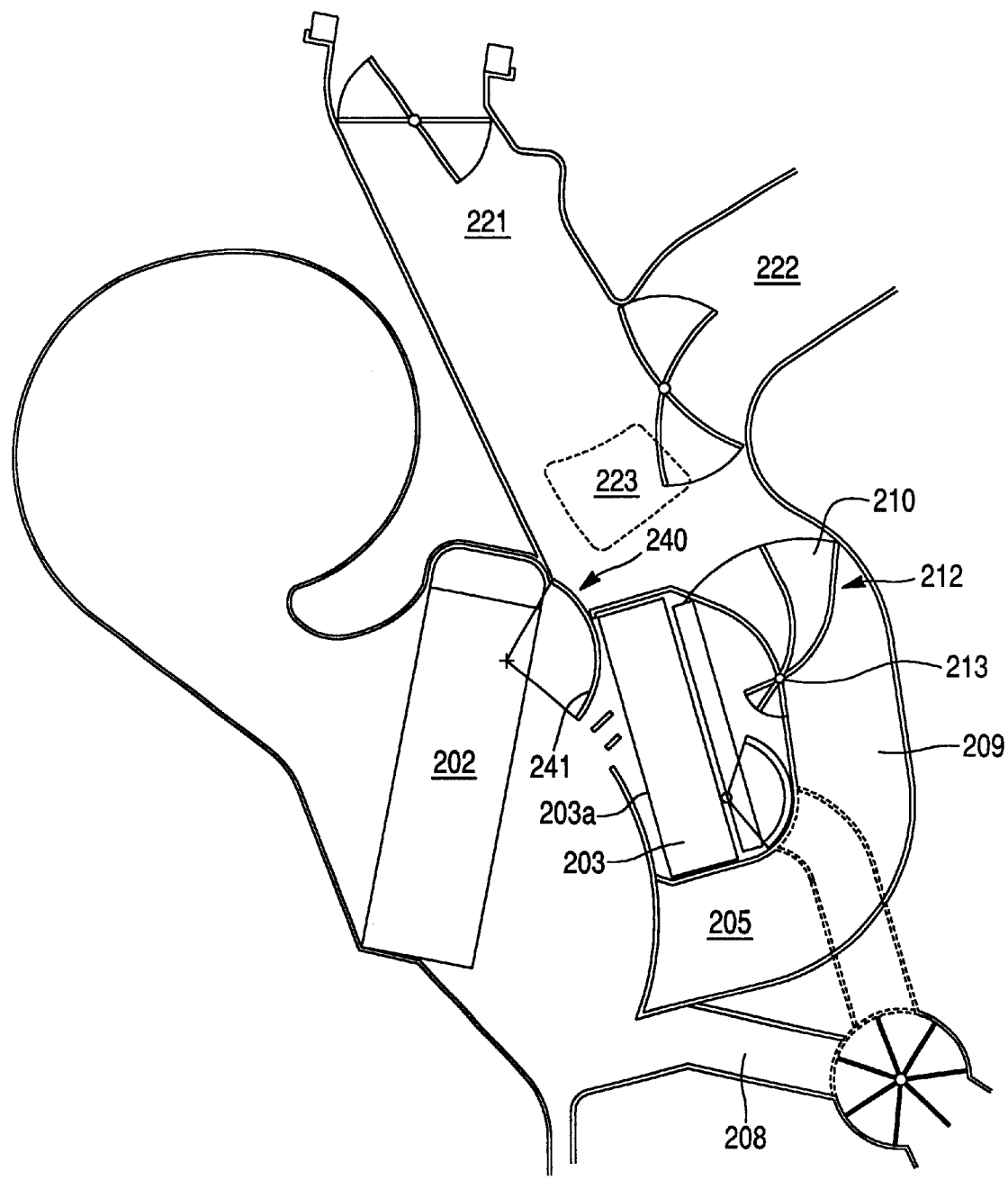
FIG. 25 is a view similar to FIG. 19, showing other modifications.

The installation illustrated in FIG. 25 essentially repeats the elements of that of FIG. 19, the differences being indicated below. The arrangement of the duct 223 with respect to the ducts 221 and 222 is modified, and the associated flap 226 is dispensed with. The shape of the mixing flap 212 is modified, and it contains its rotational axis 213. In the extreme position in which it allows a maximum hot-air throughput to the mixing region 210, it closes off the cold-air intake towards it from the duct 209. Finally, an aperture 240 adjacent to the upper edge of the front face 203a of the radiator 203, controlled by a drum flap 241, allows the air originating from the evaporator 202 to have access to the upper outlet ducts 221, 222, 223 without passing through the mixing region 210.

Here again, the arrangement of the two bypass ducts 205 and 208 below the radiator 203 makes it possible to shorten the path for the radiator hot air 203 to the outlet of the de-icing duct 221, by comparison with the installation in which one of the bypass ducts would pass above the radiator.

Figure 26:
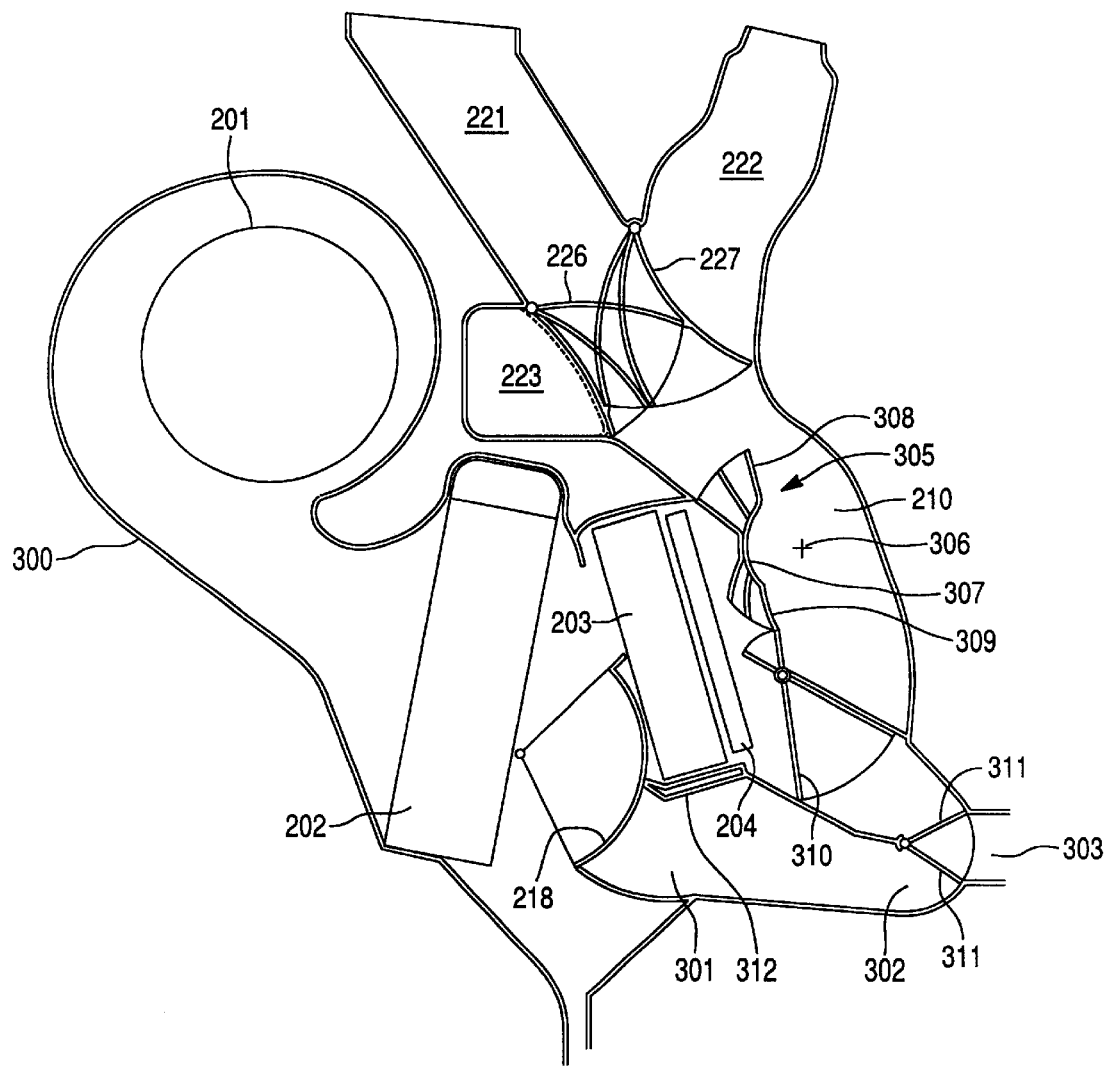
FIGS. 26 and 27 are views similar to FIGS. 1 and 2 respectively, relating to another installation according to the invention.
Figure 27:
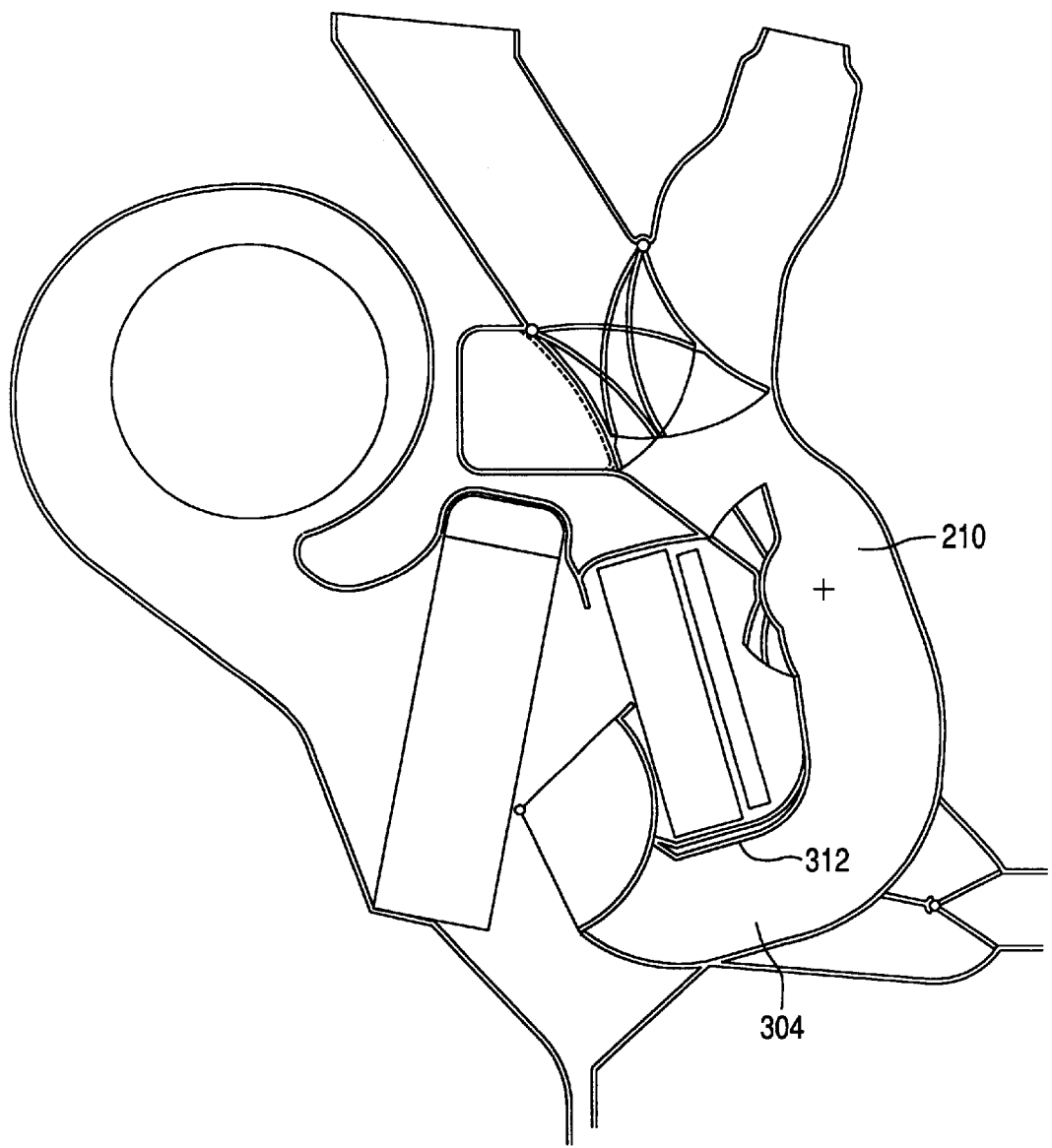

The installation illustrated in FIGS. 26 and 27 comprises a blower 201, an evaporator 202, a heating radiator 203, an auxiliary heat source 204, a mixing region 210, a drum flap 218, outlet ducts 221, 222, 223 and flaps 226, 227 associated with them, similar to the corresponding elements of FIGS. 19 and 20 and housed substantially according to the same arrangement in a casing 300.

The casing 300 furthermore delimits at least two bypass ducts passing below the radiator 203, which are mutually juxtaposed in the lateral direction, namely one or more ducts 301 each arriving at a lower mixing region 302, itself linked to the rear part of the passenger compartment via an outlet 303, and one or more ducts 304 linked to the upper mixing region 210. Vertical partitions laterally delimit the duct or ducts 301, the mixing region or regions 302 and the duct or ducts 304. As described in connection with FIGS. 5 and 16, provision can particularly be made for a single, central lower mixing region, framed by two lateral ducts 304, or two lateral mixing regions 302, framing a central duct 304.

The flap 212 of FIG. 19 is replaced by a flap 305 of specific shape, comprising, in cross-section through a plane perpendicular to its axis of pivoting 306, a central part 307 in a circular arc centred on the axis 306, similar to a drum flap, being connected to marginal parts 308, 309 which extend away from the axis from the region 307. The axis 306 lies within the region 210. This configuration allows a reduced size of the flap, and enhanced leaktightness in closed position.

The cold-air inlet in the duct or ducts 304 and the hot-air inlet in the mixing region 210 can be closed, and opened progressively, by the flaps 218 and 305 respectively, in such a way as to adjust the temperature of the air in the region 210. Two other flaps are associated with the or with each lower mixing region 302, namely a butterfly flap 310 capable of closing, or progressively opening, the access for the hot air to this region, and a flag flap 311 being capable of being shifted between two extreme positions in which the outlet 303 is linked exclusively to the cold-air inlet and exclusively to the hot-air inlet respectively. The flap 218 is hollowed facing the duct or ducts 301 in such a way as to allow for cold-air entry into it in all its positions.

A simplified installation, without separate feed for the rear part of the passenger compartment, can be produced without any modification of the casing illustrated in FIGS. 26 and 27. To that end it is sufficient to immobilise the flaps 310 and 311 in the positions in which they respectively close off the hot-air inlet and the cold-air inlet to the mixing region 302, in such a way that this region, and consequently the outlet 303, do not receive any air.

In the casing illustrated, the wall 312 separating the bypass ducts 301 and 304 from the radiator 203 is a double wall so as to enhance the thermal insulation between the radiator and cold air flowing in the bypass ducts. In a variant, this effect could be obtained by an appropriate choice of the thickness or of the material of the wall.

What is claimed is:

1. Installation for heating/ventilating or for air-conditioning of the passenger compartment of a vehicle, comprising a casing (6, 40) containing means for treating an airflow to be sent into the passenger compartment, said means including at least one first source (5) of conditioned air and changeover-switching elements (18, 19, 20, 26, 29, 32, 52) controlled in such a way as to define variable paths for said airflow between at least one inlet and various outlets associated with respective regions of passenger compartment, the casing defining a first mixing region (14) linked to at least one (27, 30) of said outlets and a second mixing region (51) linked to at least one other (47) of said outlets, each of said mixing regions being capable of receiving, in adjustable proportions, a first airflow having passed through said first source of conditioned air and a second airflow having by-passed the first source of conditioned air, wherein in that both the said second airflows pass by underneath first source of conditioned air.

2. Installation according to claim 1, in which the first mixing region is linked to at least one outlet associated with a front region of the passenger compartment and the second mixing region is linked to at least one outlet associated with a rear region of the passenger compartment.

3. Installation according to claim 1, in said first source is a source of heat and the treatment means further includes a source of cold (4) said first and second airflows pass through having a passage which and the source of cold (4) before going through or bypassing the source of heat.

4. Installation according to claim 1, in which the casing defines a single bypass duct (10) below the first source of conditioned air and means for subdividing, in a lateral direction of the casing, a second airflow having flowed in said bypass duct into at least one first fraction directed towards the first mixing region and a second fraction directed towards the second mixing region.

5. Installation according to claim 4, in which said means for subdividing the second airflow comprise a first substantially vertical partition (45, 46) juxtaposed laterally with the second mixing region.

6. Installation according to claim 1, in which the casing defines, below the first source of conditioned air, a first bypass duct (10) linked to the first mixing region and a second bypass duct (72) arriving at the second mixing region, which are mutually juxtaposed in the lateral direction of the casing, the second bypass duct and the second mixing region being separated from the first bypass duct by a first substantially vertical partition.

7. Installation according to claim 6, in which said second bypass duct (72) includes a flap (75) being capable of being shifted between an extreme position closing off the inlet of said second duct and another extreme position in which it prevents, access by the air to a part of the first source of conditioned air (5).

8. Installation according to claim 7, in which the flap (75) extends in a continuous way in the casing (6) so as to be shifted between an extreme position for simultaneous closing-off of the first bypass duct (10) and of the second bypass duct (72), and another extreme position in which it prevents access by the air to a part of the first source (5).

9. Installation according to claim 7, in which the flap (75) includes at least two flaps (75a, 75b) said flaps being capable of being shifted independently between an extreme position during which it simultaneously closes off a part of the first bypass duct (10) and a part of the second bypass duct (72), and another extreme position in which it prevents access by the air to a part of the first source of conditioned air (5).

10. Installation according to claim 7, in which the flap (75) includes three flaps (75a, 75b, 75c), the said flaps (75a, 75b) being capable of being shifted independently between an extreme position during which it closes off a part of the first bypass duct (10) and another extreme position in which it prevents access by the air to a part of the first source (5), said flap (75c) being capable of being shifted independently between an extreme position during which it closes off the second bypass duct (72) and another extreme position where it prevents access by the air to a part of the first source of conditioned air (5).

11. Installation according to claim 5, in which the said first partition is connected to an intermediate wall (8) and passes through an outer wall (9) both extending in the lateral direction and delimiting the bypass duct or ducts, the intermediate wall separating these latter from the first source of conditioned air.

12. Installation according to claim 11, in which said intermediate wall is capable of providing thermal insulation between the first source of conditioned air and the inside of the bypass duct or ducts.

13. Installation according to one claim 5, in which the first mixing region (14) features an extent in the lateral direction coinciding substantially with that of the bypass duct or of the set of bypass ducts, and is separated from the second mixing region (51) by a second partition (43) extending in this same direction and being connected to the first partition (45, 46).

14. Installation according to claim 13, in which the casing comprises a main body (6) housing the first source of conditioned air and defining the first or only bypass duct, and at least one attached piece (40) forming the first and second partitions and defining an cutlet duct extending outside the main body as far as said other outlet (47).

15. Installation according to claim 4, in which the first and second mixing regions communicate with a single volume (12) situated immediately downstream of the first source of conditioned air (5).

16. Installation according to claim 4, in which the first and second mixing regions communicate with respective volumes (12a, 12b) situated immediately downstream of the first source on either side of a separating partition (20) extending in,the lateral direction.

17. Installation according to claim 16, in which said separating partition (84) is formed by said attachment piece (40).

18. Installation according to claim 16, in which the said separating partition (20) is able to pivot about a substantially horizontal axis so as to cause the relative size of said respective volumes to vary.

19. Installation according to claim 4, in which the casing is substantially symmetric with respect to a vertical plane and defines at least one second mixing region (51) situated in a central position and, on either side of it, at least one left-hand outlet duct (31) and at least one right-hand outlet duct (31) which are connected downstream of the first mixing region (14).

20. Installation according to claim 4, in which the casing is substantially symmetric with respect to a vertical plane and defines at least one outlet duct (112) connected downstream of the first mixing region (14) and situated in a central position and, on either side of it, a second left-hand mixing region (110) and a second right-hand mixing region (110).

21. Installation according to claim 1, in which the casing defines, below the first source of conditioned air a single bypass duct (10) linked to the first mixing region (14), the bypass duct and the first mixing region featuring an extent in the lateral direction which coincides substantially with that of the first source of conditioned air as well as at least one first diversion duct (91) and a second diversion duct (92) starting respectively from a volume (12) situated immediately downstream of the first source (5) and of the bypass duct (10) so as to reach the second mixing region (93), the said diversion ducts and the second mixing region being offset laterally with respect to the first source.

22. Installation according to claim 1, in which the casing (200) defines, below the first source, a first bypass duct (205) linked to the first mixing region (210) and a second bypass duct (208) reaching the second mixing region (214) and situated below the first bypass duct.

23. Installation according to claim 22, in which said bypass ducts and the said mixing regions feature an extent in the lateral direction which coincides substantially with that of the first sources of conditioned air the casing (200) further defining, below the first source of conditioned air at least one diversion duct (215) starting from a volume (211) situated immediately downstream of the first source so His to arrive at the second mixing region, said diversion duct being offset laterally with respect to the first source of conditioned air.

24. Installation according to one claim 1, in which there is provision, in order to adjust the throughput of the first airflow at the inlet of the first mixing region (210), for a flap (305) suitable for pivoting about an axis (306) situated within the first region, this flap having a cylindrical shape with a generatrix parallel to said axis and including, in cross section, a central, circular-arc-shaped region (307) centered on the axis, being connected to two marginal regions which go away from the axis, said marginal regions (308, 309) coming to bear on a separating wall so as to define a position for leaktight closure of the flap.

* * * * *